(12) United States Patent
Zhu et al.

(10) Patent No.: US 10,360,055 B2
(45) Date of Patent: *Jul. 23, 2019

(54) PROCESSORS, METHODS, AND SYSTEMS TO ENFORCE BLACKLISTED PAGING STRUCTURE INDICATION VALUES

(71) Applicant: Intel Corporation, Santa Clara, CA (US)

(72) Inventors: Bing Zhu, Shanghai (CN); Luhai Chen, Shanghai (CN); Peng Zou, Shanghai (CN); Kai Wang, Shanghai (CN)

(73) Assignee: INTEL CORPORATION, Santa Clara, CA (US)

( * ) Notice: Subject to any disclaimer, the term of this patent is extended or adjusted under 35 U.S.C. 154(b) by 390 days.

This patent is subject to a terminal disclaimer.

(21) Appl. No.: 14/947,416

(22) Filed: Nov. 20, 2015

(65) Prior Publication Data

US 2016/0077864 A1 Mar. 17, 2016

Related U.S. Application Data

(63) Continuation of application No. 13/730,798, filed on Dec. 28, 2012, now Pat. No. 9,223,602.

(51) Int. Cl.
*G06F 9/455* (2018.01)
*G06F 9/30* (2018.01)

(52) U.S. Cl.
CPC ........ *G06F 9/45558* (2013.01); *G06F 9/3004* (2013.01); *G06F 9/30076* (2013.01); *G06F 9/45533* (2013.01); *G06F 2009/45583* (2013.01)

(58) Field of Classification Search
CPC ............. G06F 9/45558; G06F 9/30076; G06F 9/3004; G06F 9/45533; G06F 2009/45583
See application file for complete search history.

(56) References Cited

U.S. PATENT DOCUMENTS

| | | | |
|---|---|---|---|
| 7,386,697 B1 * | 6/2008 | Case | G06F 12/0897 710/9 |
| 7,596,677 B1 * | 9/2009 | Koryakin | G06F 12/1036 711/206 |
| 7,640,543 B2 | 12/2009 | Vij et al. | |

(Continued)

FOREIGN PATENT DOCUMENTS

| | | |
|---|---|---|
| CN | 101952807 A | 1/2011 |
| WO | 2014/105185 A1 | 7/2014 |

OTHER PUBLICATIONS

Final Office Action received for U.S. Appl. No. 13/730,798, dated Apr. 6, 2015, 14 pages.

(Continued)

*Primary Examiner* — Adam Lee
(74) *Attorney, Agent, or Firm* — NDWE, LLP

(57) ABSTRACT

A method of an aspect includes receiving an indication of an attempt by a virtual machine to modify a paging structure identification storage location to have a given value. It is determined that the given value matches at least one of a set of one or more blacklist values. The attempt by the virtual machine to modify the paging structure identification storage location to have the given value is trapped to a virtual machine monitor. Other methods, apparatus, and systems are also disclosed.

16 Claims, 15 Drawing Sheets

(56) References Cited

U.S. PATENT DOCUMENTS

| | | | |
|---|---|---|---|
| 7,702,843 B1* | 4/2010 | Chen | G06F 9/5016 |
| | | | 711/6 |
| 8,015,562 B2 | 9/2011 | Cibrario Bertolotti et al. | |
| 8,171,255 B1* | 5/2012 | Koryakin | G06F 12/1036 |
| | | | 711/207 |
| 8,245,227 B2 | 8/2012 | Devine et al. | |
| 9,201,612 B1* | 12/2015 | Vincent | G06F 3/0662 |
| 9,223,602 B2 | 12/2015 | Zhu et al. | |
| 2003/0217250 A1* | 11/2003 | Bennett | G06F 9/45533 |
| | | | 712/224 |
| 2004/0003323 A1* | 1/2004 | Bennett | G06F 11/0712 |
| | | | 714/36 |
| 2004/0117539 A1* | 6/2004 | Bennett | G06F 9/45558 |
| | | | 711/6 |
| 2004/0117593 A1* | 6/2004 | Uhlig | G06F 12/1036 |
| | | | 711/207 |
| 2005/0086523 A1* | 4/2005 | Zimmer | G06F 21/554 |
| | | | 726/4 |
| 2005/0223220 A1* | 10/2005 | Campbell | G06F 9/45537 |
| | | | 713/164 |
| 2005/0289542 A1* | 12/2005 | Uhlig | G06F 9/45533 |
| | | | 718/1 |
| 2006/0004944 A1* | 1/2006 | Vij | G06F 12/1491 |
| | | | 711/6 |
| 2006/0075402 A1* | 4/2006 | Neiger | G06F 9/45558 |
| | | | 718/1 |
| 2006/0174053 A1* | 8/2006 | Anderson | G06F 12/1036 |
| | | | 711/6 |
| 2006/0184349 A1* | 8/2006 | Goud | G06F 9/45537 |
| | | | 703/24 |
| 2006/0294519 A1* | 12/2006 | Hattori | G06F 9/45558 |
| | | | 718/1 |
| 2007/0006230 A1* | 1/2007 | Neiger | G06F 9/45533 |
| | | | 718/100 |
| 2007/0233455 A1* | 10/2007 | Zimmer | G06F 9/546 |
| | | | 703/27 |
| 2008/0082772 A1* | 4/2008 | Savagaonkar | G06F 12/145 |
| | | | 711/163 |
| 2009/0007112 A1* | 1/2009 | Moriki | G06F 9/45558 |
| | | | 718/1 |
| 2009/0044274 A1* | 2/2009 | Budko | G06F 21/53 |
| | | | 726/24 |
| 2009/0089527 A1* | 4/2009 | Schoenberg | G06F 9/45558 |
| | | | 711/163 |
| 2009/0125902 A1* | 5/2009 | Ghosh | G06F 9/45533 |
| | | | 718/1 |
| 2009/0172346 A1* | 7/2009 | Sahita | G06F 9/5077 |
| | | | 711/208 |
| 2009/0187697 A1* | 7/2009 | Serebrin | G06F 9/455 |
| | | | 711/6 |
| 2009/0228262 A1 | 9/2009 | Farrell et al. | |
| 2010/0115513 A1* | 5/2010 | Moriki | G06F 9/463 |
| | | | 718/1 |
| 2010/0306766 A1 | 12/2010 | Schneider | |
| 2010/0332722 A1* | 12/2010 | Oiwa | G06F 9/45558 |
| | | | 711/6 |
| 2010/0333206 A1* | 12/2010 | Dewan | G06F 21/53 |
| | | | 726/26 |
| 2011/0016290 A1* | 1/2011 | Chobotaro | G06F 9/45558 |
| | | | 711/207 |
| 2011/0047544 A1* | 2/2011 | Yehuda | G06F 9/4555 |
| | | | 718/1 |
| 2011/0047546 A1* | 2/2011 | Kivity | G06F 12/1009 |
| | | | 718/1 |
| 2011/0167195 A1* | 7/2011 | Scales | G06F 9/45558 |
| | | | 711/6 |
| 2011/0197190 A1* | 8/2011 | Hattori | G06F 9/30076 |
| | | | 718/1 |
| 2011/0219447 A1* | 9/2011 | Horovitz | G06F 9/45533 |
| | | | 726/22 |
| 2012/0226903 A1 | 9/2012 | Durham et al. | |
| 2012/0254995 A1* | 10/2012 | Sallam | G06F 21/554 |
| | | | 726/22 |
| 2012/0255031 A1* | 10/2012 | Sallam | G06F 21/53 |
| | | | 726/27 |
| 2013/0326519 A1* | 12/2013 | Anderson | G06F 9/45533 |
| | | | 718/1 |
| 2014/0006734 A1* | 1/2014 | Li | G06F 9/45558 |
| | | | 711/162 |
| 2014/0068612 A1* | 3/2014 | Torrey | G06F 9/45558 |
| | | | 718/1 |
| 2014/0115652 A1* | 4/2014 | Kapoor | G06F 21/554 |
| | | | 726/1 |
| 2014/0149634 A1* | 5/2014 | Tosatti | G06F 9/45558 |
| | | | 711/6 |
| 2014/0165056 A1* | 6/2014 | Ghai | G06F 12/0891 |
| | | | 718/1 |
| 2014/0181402 A1* | 6/2014 | White | G06F 12/0897 |
| | | | 711/122 |

OTHER PUBLICATIONS

Non-Final Office Action received for U.S. Appl. No. 13/730,798, dated Nov. 18, 2014, 14 pages.

Notice of Allowance received in U.S. Appl. No. 13/730,798, dated Aug. 21, 2015, 15 pages.

International Preliminary Report on Patentability and Written Opinion received for PCT Patent Application No. PCT/US2013/047910, dated Jul. 9, 2015, 8 pages.

International Search Report and Written Opinion received for PCT Patent Application No. PCT/US2013/047910, dated Oct. 1, 2013, 5 pages.

Office Action received for Chinese Patent Application No. 201380062295.9, dated Mar. 27, 2017, 9 pages of Chinese Office Action only.

Notice of Allowance received for Chinese Patent Application No. 201380062295.9, dated Dec. 19, 2017, 4 pages of Chinese Notice of Allowance including 2 pages of English Translation.

* cited by examiner

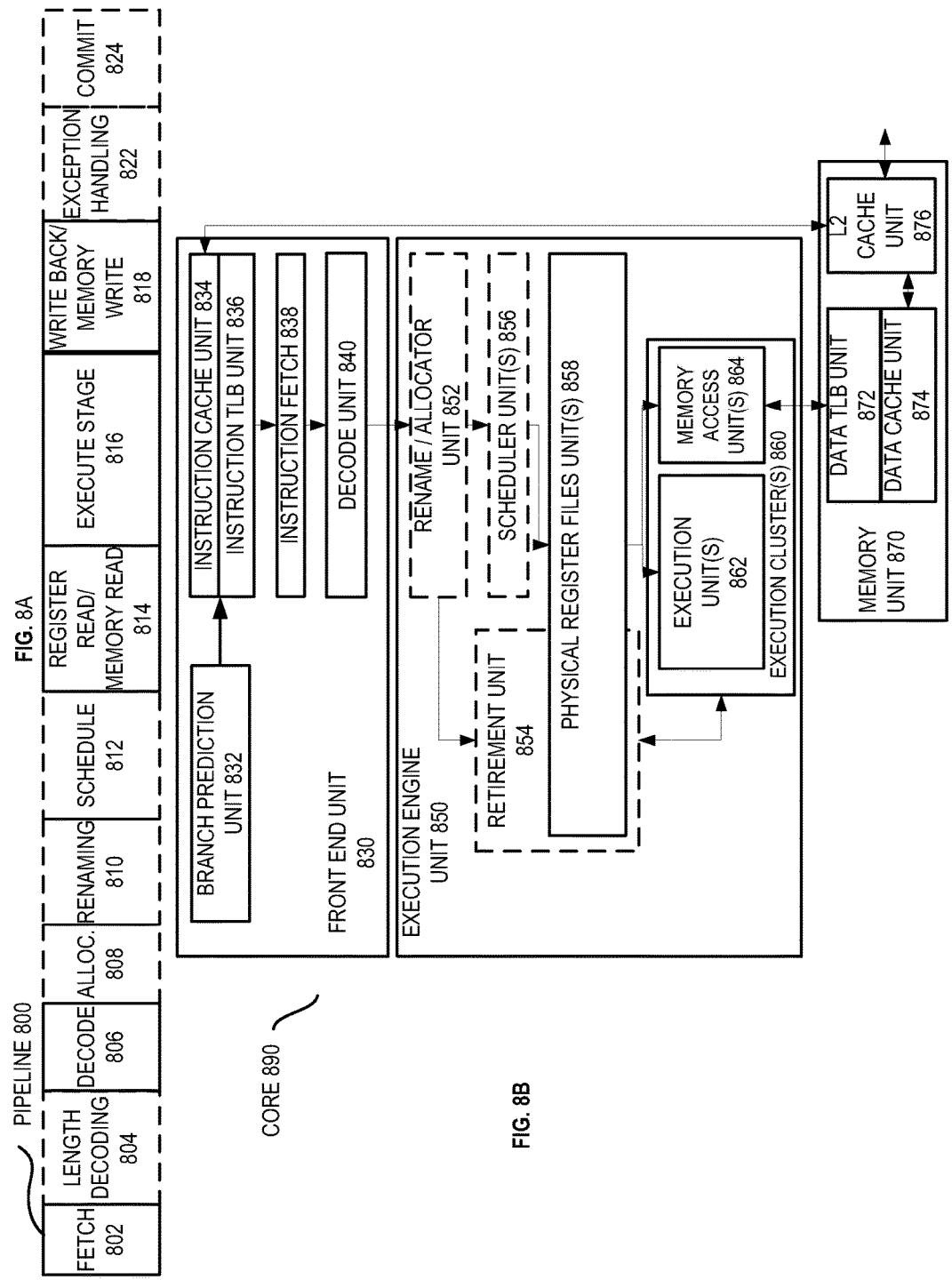

PROCESSORS, METHODS, AND SYSTEMS TO ENFORCE BLACKLISTED PAGING STRUCTURE INDICATION VALUES

CROSS-REFERENCE TO RELATED APPLICATIONS

The present application is a continuation of U.S. patent application Ser. No. 13/730,798, filed on Dec. 28, 2012, entitled "PROCESSORS, METHODS, AND SYSTEMS TO ENFORCE BLACKLISTED PAGING STRUCTURE INDICATION VALUES", which is hereby incorporated herein by reference in its entirety.

BACKGROUND

Field

Embodiments relate to the field of processors. In particular, embodiments relate to the field of processors that utilize paging.

Background Information

Many processors and systems support virtual memory and paging. Paging may allow software to restrict and control accesses by processes or tasks to sections of memory referred to as pages. Paging may be used to create a separate or independent virtual address space for each process or task. This may be used to prevent one process or task from modifying the memory of other processes or tasks.

Commonly, pages may be accessed through a paging structure hierarchy or set of paging structures, such as a page directory and page tables. A page directory may have a number of page directory entries. Each page directory entry may store an indication of (e.g., a pointer to) a page table. The page table may represent a data structure used to map virtual addresses to physical addresses. A process or task may access the page table with a virtual address and use the page table to determine a physical address of the data it seeks. Each page table may have a number of page table entries. Each page table entry may store an indication of (e.g., a pointer to) the physical address of a page.

Many processors have a control register that is used to store information to locate the independent virtual address spaces and/or the paging structures that are appropriate for each process or task. For example, a page directory base register (PDBR) may be used to store a page directory base and/or a physical address of a page directory entry. When processes or tasks are scheduled, when process or task switches occur, or the like, the processes or tasks may modify the PDBR to store that processes or tasks corresponding page directory base.

Commonly, the attempted modifications of the PDBR or other control register are monitored for security purposes. However, inefficient monitoring of the PDBR modifications may tend to cause significant performance degradations.

BRIEF DESCRIPTION OF THE SEVERAL VIEWS OF THE DRAWINGS

The invention may best be understood by referring to the following description and accompanying drawings that are used to illustrate embodiments of the invention. In the drawings:

FIG. 8A is a block diagram illustrating both an exemplary in-order pipeline and an exemplary register renaming, out-of-order issue/execution pipeline according to embodiments of the invention.

FIG. 8B is a block diagram illustrating both an exemplary embodiment of an in-order architecture core and an exemplary register renaming, out-of-order issue/execution architecture core to be included in a processor according to embodiments of the invention.

DETAILED DESCRIPTION

In the following description, numerous specific details are set forth (for example specific sequences of operations, logic implementations, processor configurations, microarchitectural details, logic partitioning/integration details, types and interrelations of system components, and the like). However, it is understood that embodiments of the invention may be practiced without these specific details. In other instances, well-known circuits, structures and techniques have not been shown in detail in order not to obscure the understanding of this description.

Figure 1:
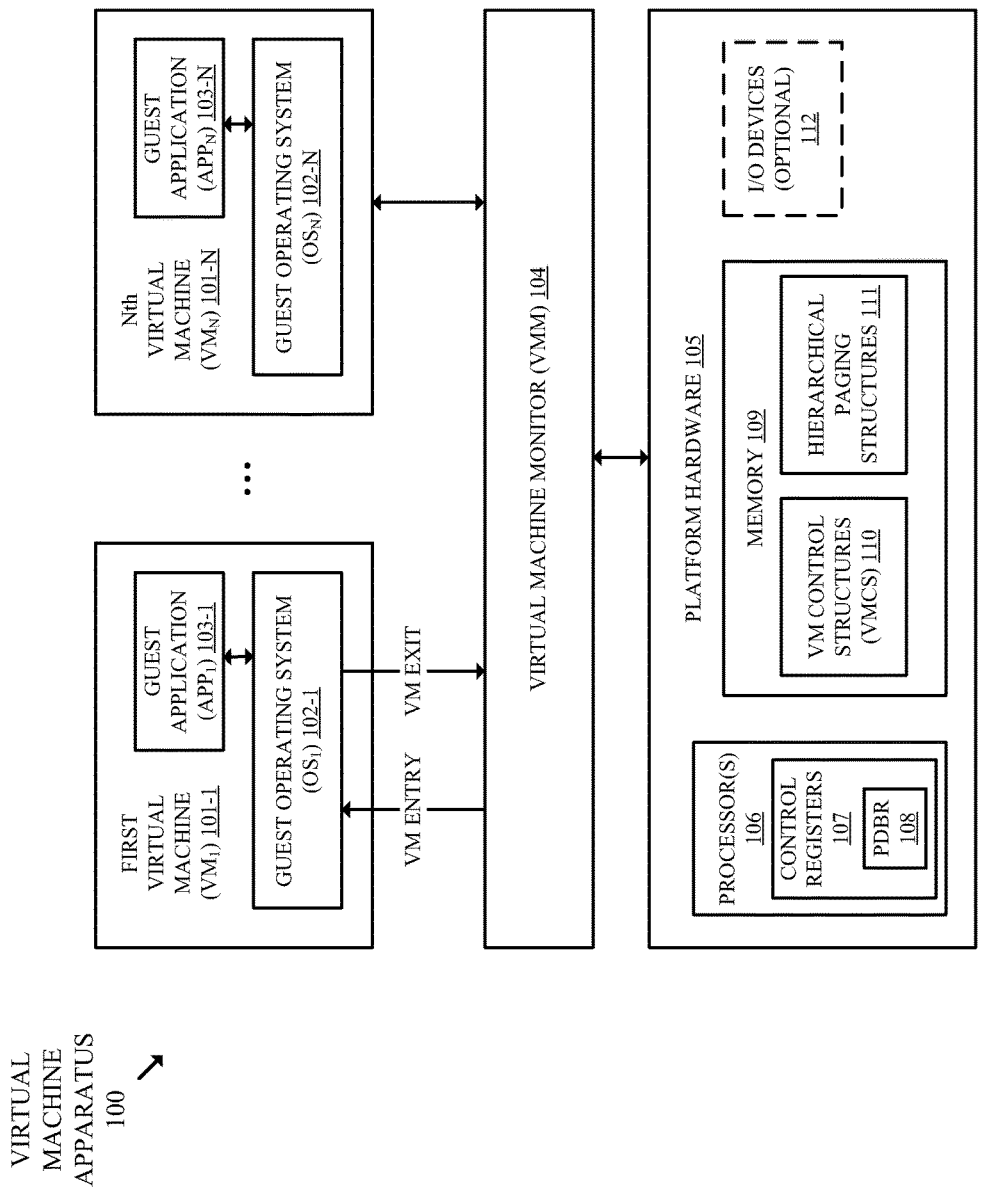
FIG. 1 is a block diagram of an embodiment of a virtual machine apparatus that is suitable for implementing various embodiments of the invention.

FIG. 1 is a block diagram of an embodiment of a virtual machine apparatus 100 that is suitable for implementing various embodiments of the invention. The virtual-machine apparatus includes a plurality of virtual machines (VMs) 101, a virtual machine monitor (VMM) 104, and platform hardware 105.

The platform hardware 105 may include that found in desktop computers, laptop computers, handheld computers, cellular phones, handheld devices, servers, network elements, set-top boxes, or other types of electronic devices. The platform hardware includes at least one processor 106, at least one memory 109, and optionally one or more input and/or output (I/O) devices 112. The processor may be any type of processor capable of executing software. In some embodiments, the processor may be a general-purpose processor (e.g., of the type used in desktop, laptop, and like computers). Alternatively, the processor may be special-purpose processor. Examples of suitable special-purpose processors include, but are not limited to, network processors, communications processors, cryptographic processors, graphics processors, co-processors, embedded processors, digital signal processors (DSPs), and controllers (e.g., microcontrollers), to name just a few examples. Two or more processors, of either the same or different type, may also optionally be used. The at least one memory may include a hard disk, a floppy disk, random access memory (RAM), read only memory (ROM), flash memory, any other type of machine-readable medium that is readable by the processor, or a combination thereof. The memory may store instructions and/or data to perform one or more embodiments disclosed elsewhere herein.

The virtual-machine apparatus also includes the virtual machine monitor (VMM) 104. The VMM may be implemented in software, firmware, hardware, or a combination thereof. In the illustration, a single VMM is shown, although in other embodiments two or more VMMs may be used. The VMM may emulate and export a bare machine interface to higher level software. Such higher level software may include, for example, a standard or real-time operating system (OS), a highly stripped down operating apparatus with limited OS functionality, software that does not necessarily include traditional OS functionality and/or facilities, etc. The VMM may present the abstraction of the virtual machines (VMs) 101 to other software (e.g., guest software running on and/or within the VMs).

The illustrated embodiment includes a first virtual machine ($VM_1$) 101-1 through an $N^{th}$ virtual machine ($VM_N$) 101-N, where the number N may be any appropriate number. Each VM has its own guest software. As shown, the first VM may have a first guest operating system ($OS_1$) 102-1 and optionally a first guest application ($APP_1$) 103-1, whereas the $N^{th}$ VM may have an $N^{th}$ operating system ($OS_N$) 102-N and optionally an $N^{th}$ guest application ($APP_N$) 103-N. The guest software on each VM may expect to access at least some of the platform hardware (e.g., the processor 106, the memory 109, the I/O devices 112, etc.). The VMM may facilitate access by the guest software to the platform hardware, while retaining ultimate control over the platform hardware and/or over certain events (e.g., interrupts) to help provide proper operation of the guest software and to help provide protection from and between the guest software.

The VMM may be said to run in root operation mode, whereas the VMs (e.g., the guest software) may be said to run in non-root operation mode. The VM and/or the non-root operation mode are less privileged than the VMM and/or the root operation mode. The VMM may be protected from all guest software. The guest software in a VM may not need to know that the VMM exists and/or that it is sharing the platform hardware with other VMs. The VMM may isolate the guest software stacks for the different VMs from one another. The VMM may also take over control when certain types of events occur.

Transitions into VM operation and/or the transfer of control from the VMM to the VM (e.g., to guest software) is referred to as a VM entry. In one embodiment, a VM entry is achieved by executing a special instruction, although this is not required. Transitions from VM operation back to VMM operation and/or the transfer of control from the VM to the VMM is referred to herein as a VM exit. Potential causes of VM exits include, but are not limited to, certain types of privileged exceptions, platform events, or virtualization events. As will be explained further below, in some embodiments a VM exit may be caused by an illegal attempt to modify a control register. In one embodiment, when a VM exit occurs, control is passed to the VMM at a specific entry point (e.g., an instruction pointer value), for example indicated in a virtual machine control structure (VMCS) 110. In another embodiment, control is passed to the VMM after vectoring through a redirection structure. Alternatively, any other suitable mechanism may be used to transfer control from the VM or guest software to the VMM.

Referring again to FIG. 1, the memory stores at least one virtual machine control structure (VMCS) 110. The VMCS may control certain aspects associated with the operation of the virtual-machine apparatus (e.g., certain aspects of VM operation and/or transitions between VM operation and VMM operation). It is to be appreciated that there are many different possible ways to implement the VMCS. In some embodiments, a different VMCS may be used for each different VM, or in other embodiments a VMCS may be used for multiple VM. In some embodiments, a different VMCS may be used for each different logical or virtual processor within a VM, or in other embodiments a VMCS may be used for multiple logical or virtual processors and/or multiple VMs. Other examples are also contemplated.

The processor has a set of one or more control registers 107 to control certain aspects associated with the operation of the processor. As shown, in some embodiments, the control registers may include a page directory base register (PDBR) 108. The PDBR is operable to store paging structure identification information in the form of a page directory base. Alternatively, the paging structure identification information and/or page directory base may be stored in another location, such as, for example, in the memory 109. In some embodiments, the page directory base and/or the paging structure identification information may provide a point of entry into a paging structure and/or hierarchical set of paging structures 111 in the memory 109.

Figure 2:
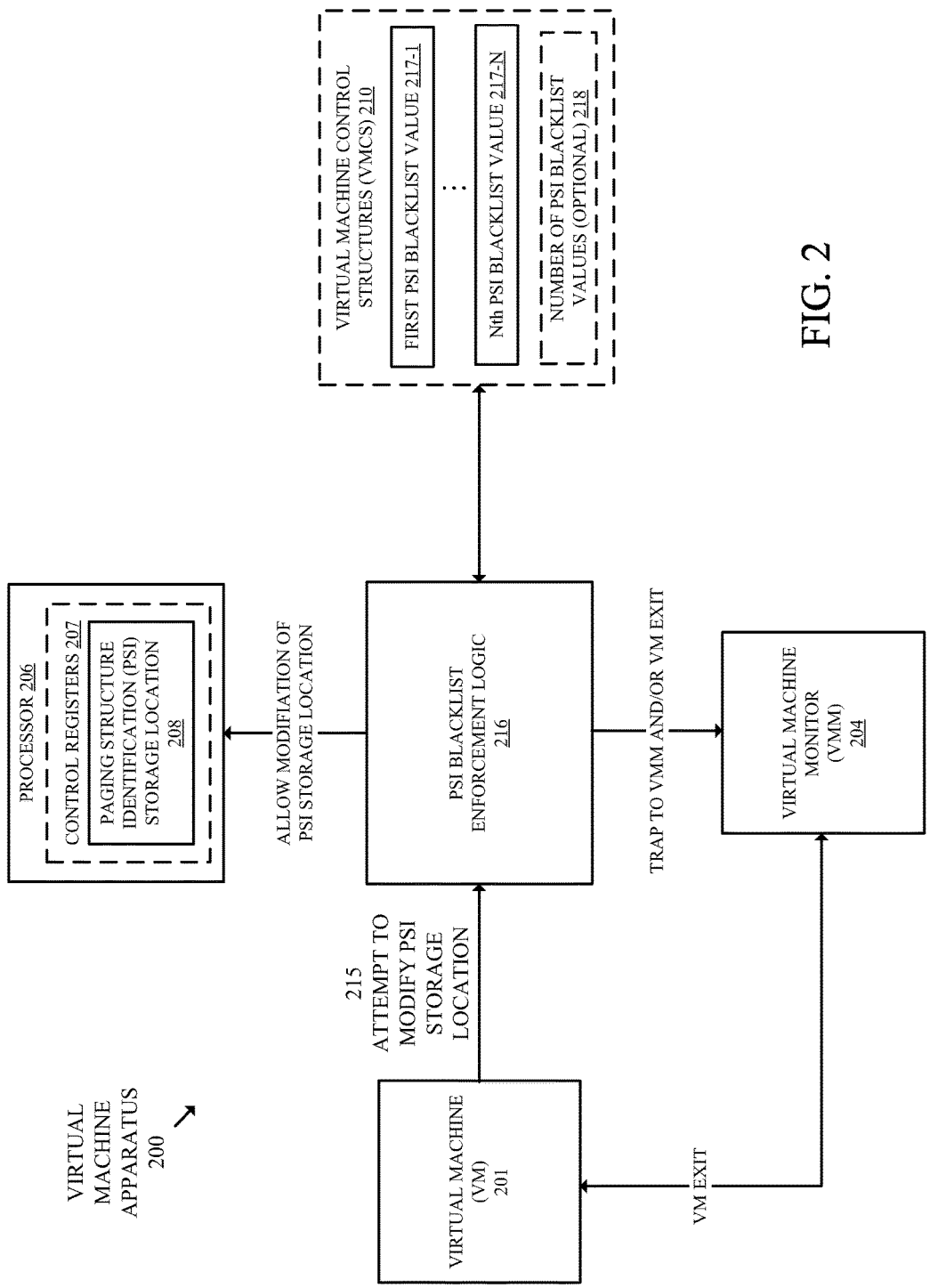
FIG. 2 is a block diagram of an embodiment of a virtual machine apparatus.

FIG. 2 is a block diagram of an embodiment of a virtual machine apparatus 200. In some embodiments, the virtual machine apparatus of FIG. 2 may be implemented within the virtual machine apparatus of FIG. 1. In such embodiments, any of the features and options described above for FIG. 1 may optionally be used with the virtual machine apparatus of FIG. 2. Alternatively, the virtual machine apparatus of FIG. 2 may be included within a similar or an entirely different the virtual machine apparatus than the one shown in FIG. 1.

The virtual machine apparatus 200 includes a virtual machine (VM) 201. In some embodiments, the VM may attempt to modify 215 a paging structure identification (PSI) storage location 208, such as, for example, a page directory base register (PDBR). For example, when a process (e.g., an operating system task) is scheduled the VM may attempt to execute an instruction to store a value (e.g., specified or otherwise indicated by an operand of the instruction) in the PSI storage location. In some embodiments, the value may correspond to the process that is attempting to execute the instruction (e.g., the value may indicate a paging directory or other paging structure that corresponds to the process). In some embodiments, the PSI storage location may optionally be included within a set of control registers 207 of a processor 206. Alternatively, the PSI storage location may be included elsewhere (e.g., within a configuration space of the processor, within memory, within a VMCS, etc.).

A PSI blacklist enforcement logic 216 may notice, observe, intercept, or otherwise receive an indication of the attempt by the VM to modify 215 the PSI storage location 208. The PSI blacklist enforcement logic may be operable to determine whether or not to allow the attempt by the VM to modify the PSI storage location. The PSI blacklist enforcement logic is coupled or otherwise in communication with a set of one or more PSI blacklist values 217. As shown, in the illustrated embodiment, the set of PSI blacklist values may include a first PSI blacklist value 217-1 through an Nth PSI blacklist value 217-N, where the integer N may have any value appropriate for the particular implementation. Commonly, the number N is on the order of tens or less and/or is less than a number of processes in the virtual machine apparatus (e.g., commonly on the order of a hundred or more). In various example embodiments, the number N may range from about 1 to about 20 inclusive, or from about 1 to about 10 inclusive, or from about 1 to about 4 inclusive, although the scope of the invention is not so limited. In some embodiments, the number of the PSI blacklist values currently being used (e.g., the magnitude of the integer N) may also optionally be stored and used by the PSI blacklist enforcement logic. As shown, in some embodiments, the set of the one or more PSI blacklist values 217, as well as the number of the PSI blacklist values 218, may optionally be stored in one or more virtual machine control structures (VMCS) 210, which may be coupled or otherwise in communication with the PSI blacklist enforcement logic.

In some embodiments, the PSI blacklist enforcement logic 216 may be operable to determine whether or not to allow the attempt to modify 215 the PSI storage location 208 based at least in part on a comparison of a value corresponding to the attempt to modify the PSI storage location (e.g., the value indicated by the operand of the instruction that is attempting to modify the PSI storage location) with the set of the one or more PSI blacklist values 217. For example, the comparison may be made to determine whether or not the value matches or equals one of the PSI blacklist values. If the optional number of PSI blacklist values is specified as N, then only the first N of the PSI blacklist values may be considered. In some embodiments, the PSI blacklist enforcement logic may be operable to allow the attempt to modify the PSI storage location if the value does not equal or match any of the set of PSI blacklist values. This may be done without a need to trap to the VMM and/or induce a VM exit. If the optional number of PSI blacklist values is specified as N equal to zero, then the attempt to modify the PSI may be allowed regardless of the value to be stored in the PSI storage location. In such cases, the value may be written to or stored in the PSI storage location.

Conversely, in some embodiments, the PSI blacklist enforcement logic 216 may be operable to induce, request, cause, or otherwise result in a trap to the VMM and/or a VM exit if the value equals or matches any of the set of PSI blacklist values 217. After trapping to the VMM, the VMM may perform further processing (e.g., according to configured policies or rules) in order to determine whether or not to allow the attempt to modify 215 the PSI storage location 208. For example, the VMM may inspect the process corresponding to the attempted modification. If the VMM perceives the process as being trustworthy, then the VMM may determine to allow the attempted modification and/or the VMM may potentially make the attempted modification itself. Alternatively, if the VMM perceives the process as untrustworthy and/or suspects that the process is attempting to do illegal things, then the VMM may prevent the attempted modification and/or kill the process gracefully. The VMM may optionally log such events. The PSI blacklist values may thus represent a set of values that the VM is not allowed to write or store in the PSI storage location without prior monitoring and approval from the VMM.

In some embodiments, the blacklisted values may represent physical addresses of paging structure identification and/or page directory base for processes or tasks of interest for closer monitoring purposes. For example, this may useful when unsigned programs, unidentified programs, programs from unknown sources, web browser processes, otherwise untrusted programs, or the like, are about to run or are running. The paging structure identification and/or page directory base for such types of processes may be added to the blacklist values by a user or privileged software during runtime. This may allow more close monitoring of the behavior of these programs and allow attempted modifications of the PSI storage location to be trapped to the VMM when they match the blacklist. The VMM may then analyze the attempted modification and determine based on various different criteria, which do not limit the invention, whether or not to allow the attempted modification.

In various embodiments, the PSI blacklist enforcement logic may be implemented in hardware (e.g., integrated circuitry, transistors, etc.), firmware (e.g., microcode), software (e.g., part of the VMM), or a combination thereof. In some embodiments, the PSI blacklist enforcement logic may be implemented in persistent on-die processor logic, for example, hardware, firmware, or a combination thereof.

Figure 3:
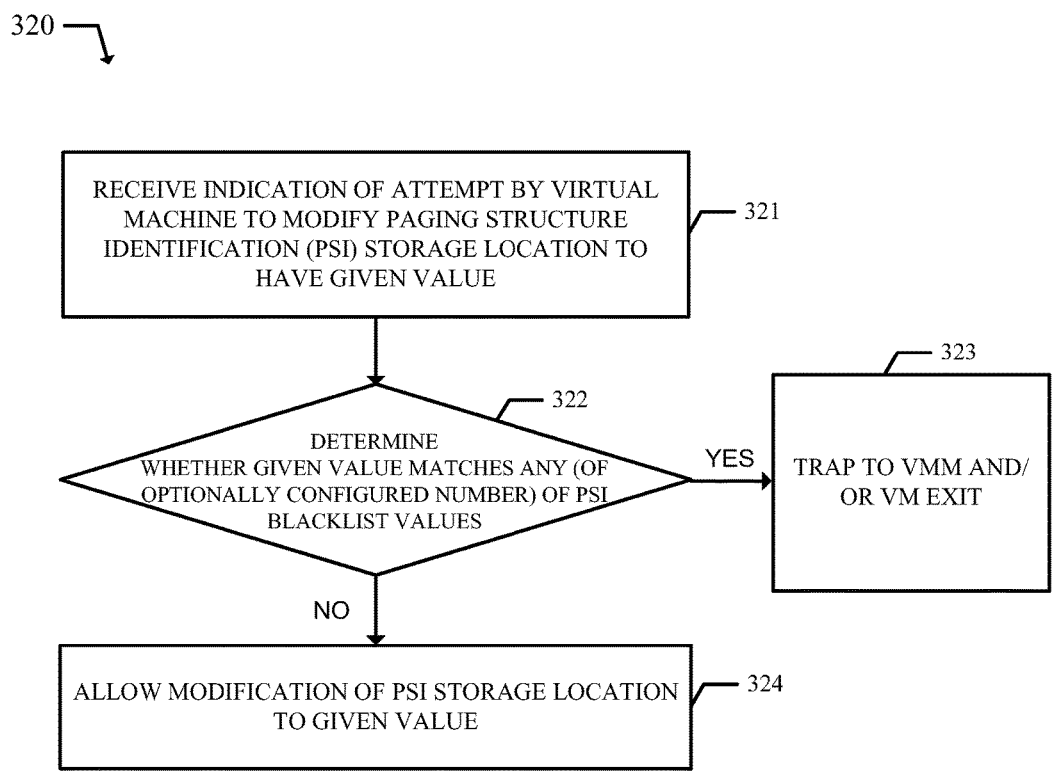
FIG. 3 is a block flow diagram of an embodiment of a method of determining whether or not to allow an attempt by a virtual machine to modify paging structure identification (PSI) storage location.

FIG. 3 is a block flow diagram of an embodiment of a method 320 of determining whether or not to allow an attempt by a virtual machine to modify paging structure identification (PSI) storage location. In some embodiments, the operations and/or method of FIG. 3 may be performed by and/or within either of the virtual machine apparatuses of FIGS. 1-2. In such embodiments, any of the features and options described above for FIGS. 1-2 may optionally be used with the method of FIG. 3 and/or any of the features and options described for the method of FIG. 3 may optionally be used with the virtual machine apparatuses of FIGS. 1-2. Alternatively, the operations and/or method of FIG. 3 may be performed by and/or within a similar or an entirely different virtual machine apparatus. Moreover, the virtual machine apparatuses of FIGS. 1-2 may perform operations and/or methods either the same as, similar to, or entirely different than, those of FIG. 3.

Referring to the illustration, an indication of the attempt by the VM to modify the PSI storage location to have a given value is noticed, observed, intercepted, or otherwise received, at block 321. In some embodiments, this may include receiving an indication of an attempt by the VM to execute an instruction to store a value specified or otherwise indicated by the instruction to the PSI storage location. For example, such an attempt may be performed when a process (e.g., an operating system task) is scheduled on the VM, and the value may correspond to a page directory or structure corresponding to a virtual address space of the process. In some embodiments, the indication of the attempt by the VM to modify the PSI storage location may be received at PSI blacklist enforcement logic.

A determination is made whether the given value matches or equals any (of an optionally configured number) of PSI blacklist values, at block 322. This may include comparing the given value to each of the optionally configured number of PSI blacklist values. In some embodiments, this may include accessing the configured number of the set of the blacklisted values, and comparing the given value with only the configured number of the set of the blacklisted values. Allowing the number of PSI blacklist values to be configured is optional and not required.

Assuming that at least one PSI blacklist value is configured, if the determination is that the given value matches or equals any of the configured PSI blacklist values (i.e., "yes" is the determination at block 322), then this may result in a trap to the VMM and/or a VM exit at block 323. As previously mentioned, the VMM may determine whether or not to allow the attempted modification based on its configured policies or rules. For example, if the VMM perceives the attempting process as untrustworthy or suspects illegal or undesirable behavior, then the VMM may prevent the attempted modification and in some cases may kill the attempting process gracefully Conversely, if the determination is that the given value does not match or equal any of the configured PSI blacklist values (i.e., "no" is the determination at block 322), then the attempted modification of the PSI storage location may be allowed or permitted, at block 324. In some embodiments, if zero PSI blacklist values are currently configured and/or if the PSI blacklist enforcement mechanism is optionally turned off, then the attempted modification of the PSI storage location to the given value may also be allowed.

Figure 4:
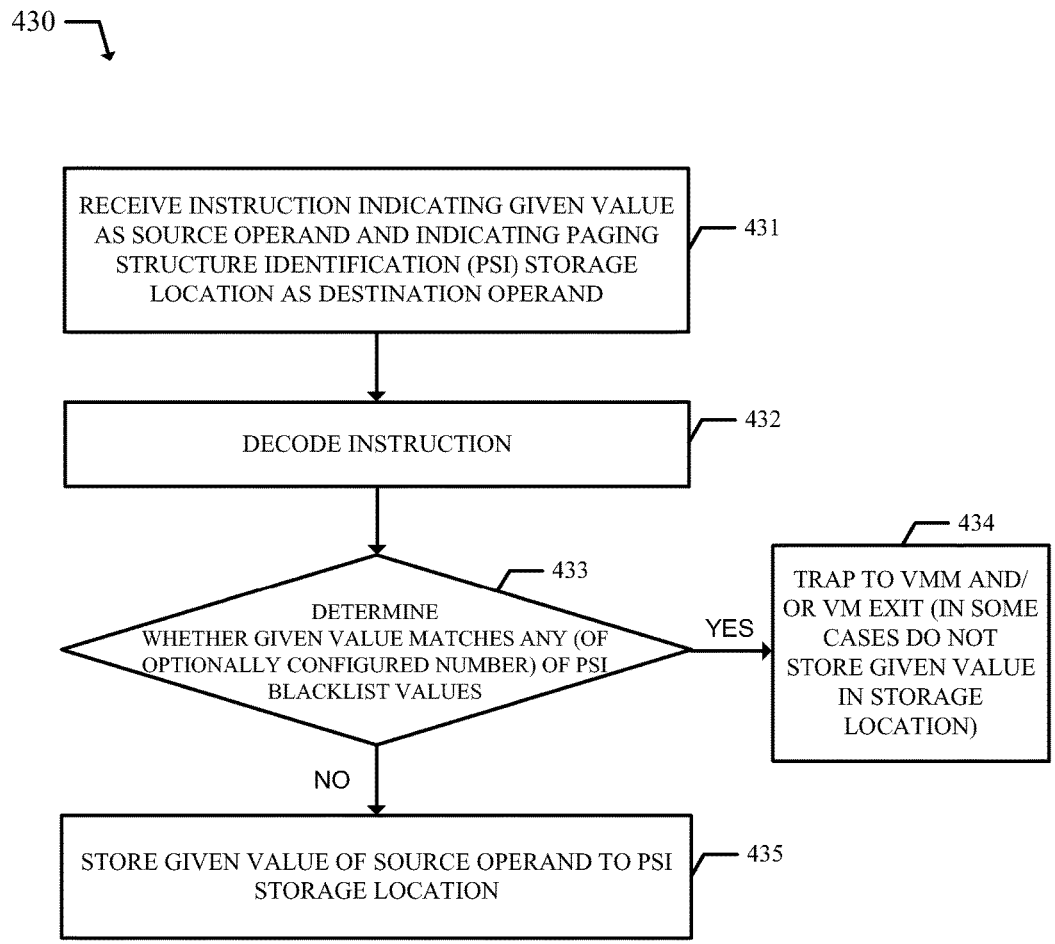
FIG. 4 is a block flow diagram of an embodiment of a method of processing an instruction that attempts to modify paging structure identification (PSI) storage location.

FIG. 4 is a block flow diagram of an embodiment of a method 430 of processing an instruction that attempts to modify paging structure identification (PSI) storage location. In some embodiments, the operations and/or method of FIG. 4 may be performed by and/or within either of the virtual machine apparatuses of FIGS. 1-2. In such embodiments, any of the features and options described above for FIGS. 1-2 may optionally be used with the method of FIG. 4 and/or any of the features and options described for the method of FIG. 4 may optionally be used with the virtual machine apparatuses of FIGS. 1-2. Alternatively, the operations and/or method of FIG. 4 may be performed by and/or within a similar or an entirely different virtual machine apparatus. Moreover, the virtual machine apparatuses of FIGS. 1-2 may perform operations and/or methods either the same as, similar to, or entirely different than, those of FIG. 4.

Referring to the illustration, the instruction is received, at block 431. In some embodiments, the instruction may indicate a given value as a source operand and indicate the PSI storage location as a destination operand. The given value and the PSI storage location may each be explicitly specified (e.g., through one or more fields) or otherwise indicated (e.g., implicitly indicated) by the instruction. The source operand may identify a general-purpose register, memory location, other storage location, or may be an immediate. In some embodiments, the instruction may be received at a processor or a portion thereof (e.g., an instruction decoder, an instruction queue, etc.).

The instruction may be decoded, at block 432. For example, the instruction may represent a relatively higher-level machine instruction or macroinstruction that may be decoded by an instruction decoder into one or more lower-level micro-operations, micro-code entry points, microinstructions, or other relatively lower-level instructions or control signals. Alternatively, rather than being decoded, the instruction may be emulated, translated, morphed, interpreted, otherwise converted, or a combination thereof (e.g., emulated and decoded).

A determination may be made whether the given value indicated by the instruction matches or equals any (of an optionally configured number) of PSI blacklist values, at block 433. This may include comparing the given value to each of the optionally configured number of PSI blacklist values. Allowing the number of PSI blacklist values to be configured is optional and not required.

Assuming that at least one PSI blacklist value is configured, if the determination is that the given value matches or equals any of the configured PSI blacklist values (i.e., "yes" is the determination at block 433), then this may result in a trap to the VMM and/or a VM exit. As previously mentioned, the VMM may determine whether or not to allow the attempted modification based on its configured policies or rules. For example, if the VMM perceives the attempting process as untrustworthy or suspects illegal or undesirable behavior, then the VMM may prevent the attempted modification and in some cases may kill the attempting process gracefully.

Conversely, if the determination is that the given value indicated by the instruction does not match or equal any of the configured PSI blacklist values (i.e., "no" is the determination at block 433), then the given value indicated by the instruction may be written to or stored in the PSI storage location without trapping to the VMM, at block 435. In some embodiments, if zero PSI blacklist values are currently configured and/or if the PSI blacklist enforcement mechanism is optionally turned off, then the given value indicated by the instruction may also be written to or stored in the PSI storage location. The store to the PSI storage location may be accomplished by a write, a load, a move, or other type of store operation. If desired, such a store operation may also optionally be combined with other types of operations performed by instructions known in the arts.

Figure 5:
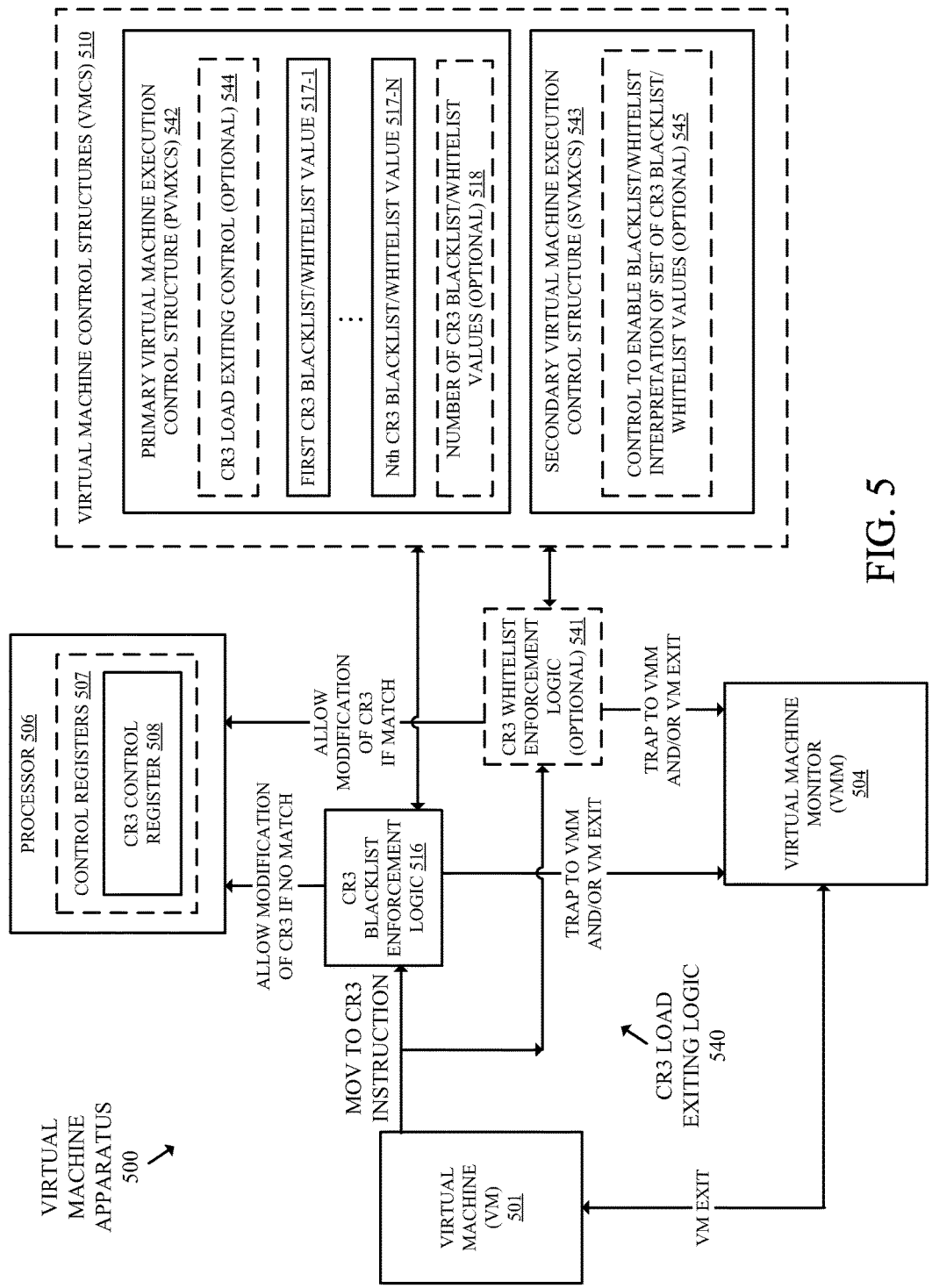
FIG. 5 is a block diagram of a detailed example embodiment of a virtual machine apparatus.

FIG. 5 is a block diagram of a detailed example embodiment of a virtual machine apparatus 500. In some embodiments, the virtual machine apparatus of FIG. 5 may be implemented within the virtual machine apparatus of FIGS. 1-2. In such embodiments, any of the features and options described above for FIGS. 1-2 may optionally be used with the virtual machine apparatus of FIG. 5. Alternatively, the virtual machine apparatus of FIG. 5 may be included within a similar or an entirely different the virtual machine apparatus than that of FIGS. 1-2. Moreover, the virtual machine apparatus of FIG. 5 may perform the operations or methods of FIGS. 3-4, or similar, or entirely different methods.

The virtual machine apparatus 500 includes a virtual machine (VM) 501. In some embodiments, the VM may attempt to execute a MOV to CR3 instruction (or other move to control register instruction or store in control register instruction) to attempt to store a value in a general-purpose register specified by a source operand of the instruction in a CR3 control register 508 indicated by the instruction. In some embodiments, each process or task (e.g., each operating system task) may have a different corresponding unique CR3 and/or page directory base value that references its corresponding separated virtual address space page tables. When there is a process or task switch, the operating system of a VM may attempt to store the different page directory base value in the CR3 register. The CR3 control register is one of a set of control registers 507 of a processor

506. The CR3 control register represents an example embodiment of paging structure identification (PSI) storage location and/or an example embodiment of a page directory base register (PDBR). Alternatively, other PSI storage locations, PDBRs, and/or instructions may be used instead.

In some embodiments, a CR3 load exiting control 544 may optionally be included to allow user configurable activation and/or deactivation of CR3 load exiting logic 540, although this is not required (e.g., it may be statically activated). In some embodiments, the CR3 load exiting control may be a single bit, although this is not required. The CR3 load exiting control may have a first value (e.g., binary one) to activate or enable the CR3 load exiting logic, or a second value (e.g., binary zero) to deactivate or disable the CR3 load exiting logic. When activated the CR3 load exiting logic may be operable to monitor and when appropriate prevent the MOV to CR3 instruction from storing an illegal value in the CR3 register (i.e., prevent an illegal modification of the CR3 register). As shown, in some embodiments, the CR3 load exiting control may be included in a primary virtual machine execution control structure (PVMXCS) 542 of a set of virtual machine control structures (VMCSs) 510, although this is not required (e.g., it may be included elsewhere such as within the control registers of the processor). By way of example, the CR3 load exiting bit may represent bit 15 in the PVMXCS.

The CR3 load exiting logic may be coupled or in communication with a set of one or more CR3 blacklist and/or whitelist values 517. As shown in the illustration, the set of CR3 blacklist/whitelist values may include a first CR3 blacklist/whitelist value 517-1 through an Nth CR3 blacklist/whitelist value 517-N, where N may have a value similar to those described elsewhere herein. As shown, in some embodiments, the CR3 blacklist/whitelist values may be stored in the PVMXCS, although this is not required. In some embodiments, the CR3 blacklist/whitelist values may represent CR3 target values. In various embodiments, each of the CR3 blacklist/whitelist values may have 32-bits, 64-bits, or some other number of bits (e.g., 16-bits, 128-bits, etc.). In some embodiments, the number of the currently configured CR3 blacklist/whitelist values 518 (e.g., a CR3 target count) may also optionally be stored in the PVMXCS, although this is not required.

The CR3 load exiting logic 540 includes an embodiment of CR3 blacklist enforcement logic 516 and optionally CR3 whitelist enforcement logic 541. In the illustration the blacklist and whitelist enforcement logic are shown as separate, although in another embodiment an integrated blacklist and whitelist enforcement logic may include alternately both blacklist and whitelist capabilities. An embodiment of a control 545 (e.g., one or more bits) may optionally be included to allow a user to configure or control whether the set of CR3 blacklist/whitelist values 517 are to be interpreted as blacklist or whitelist values. Alternatively, if a whitelist interpretation is not supported then the aforementioned control may optionally be omitted (e.g., the processor may implicitly understand to use a blacklist interpretation). In one particular embodiment, the control 545 may be a single bit. The control 545 may have a first configuration or value (e.g., binary one according to one possible convention) to cause the CR3 blacklist enforcement logic 516 to interpret the set of CR3 blacklist/whitelist values 517 as blacklist values, or a second configuration or value (e.g., binary zero according to one possible convention) to cause the CR3 whitelist enforcement logic 541 to interpret the set of CR3 blacklist/whitelist values 517 as whitelist values. In some embodiments, the control 545 may be included in a secondary virtual machine execution control structure (SVMXCS) 543 of the set of VMCS 510, although this is not required (e.g., it may be included elsewhere such as within the PVMXCS 542 or within the control registers of the processor).

If the control 545 is configured to cause a blacklist interpretation of the set of CR3 blacklist/whitelist values 517, then the CR3 blacklist enforcement logic 516 may receive an indication of the attempt by the VM to execute the MOV to CR3 instruction. The CR3 blacklist enforcement logic may be operable to determine whether or not to trap to the VMM and/or cause a VM exit. As shown, in some embodiments, the attempted modification of the CR3 register by the MOV to CR3 instruction may be allowed without a trap to the VMM if the value indicated by the source operand of the MOV to CR3 instruction does not equal or match any of the optionally configured number of the set of CR3 blacklist/whitelist values. If the optional configured number of CR3 blacklist values is specified as N, then only the first N CR3 blacklist values may be considered. If the optional number of CR3 blacklist values is specified as N equal to zero (i.e., there are no blacklist values configured), then the attempt to modify the CR3 register is allowed regardless of the value to be stored in the CR3 register. Conversely, the attempted modification of the CR3 register by the MOV to CR3 instruction may be trapped to the VMM and/or a VM exit may be performed if the value indicated by the source operand of the MOV to CR3 instruction equals or matches any of the set of CR3 blacklist/whitelist values. The VMM may then determine whether to allow or prevent the attempted modification.

Alternatively, if the control 545 is configured to cause a whitelist interpretation of the set of CR3 blacklist/whitelist values 517, then the CR3 whitelist enforcement logic 541 may receive an indication of the attempt by the VM to execute the MOV to CR3 instruction.

As shown, in some embodiments, the attempted modification of the CR3 register by the MOV to CR3 instruction may be trapped to the VMM and/or a VM exit may be performed if the value indicated by the source operand of the MOV to CR3 instruction does not equal or match any of the set of CR3 whitelist values. If the optional configured number of CR3 whitelist values is specified as N, then only the first N CR3 whitelist values may be considered. If the optional number of CR3 whitelist values is specified as N equal to zero (i.e., there are no whitelist values configured), then the attempt to modify the CR3 register may be trapped to the VMM and/or a VM exit may be performed regardless of the value to be stored in the CR3 register. In some embodiments, after the trap to the VMM and/or the VM exit the VMM may determine not to allow the attempted modification of the CR3 register and may prevent the attempted modification. Conversely, the attempted modification of the CR3 register by the MOV to CR3 instruction may be allowed without a trap to the VMM or a VM exit if the value indicated by the source operand of the MOV to CR3 instruction equals or matches any of the set of CR3 blacklist/whitelist values. As before, if the optional configured number of CR3 whitelist values is specified as N, then only the first N CR3 whitelist values may be considered.

This is just one detailed example embodiment of a suitable virtual machine apparatus. Many additional variations on these embodiments are contemplated. For example, other embodiments may store the CR3 load exiting control, the set of CR3 blacklist/whitelist values, the number of CR3 blacklist/whitelist values, the enable blacklist/whitelist interpretation control, or any combination thereof, in different ways (e.g., differently among one or more VMCS and/or in control registers of the processor. As another example, other embodiments may utilize different types of instructions to modify a PSI storage location.

Figure 6:
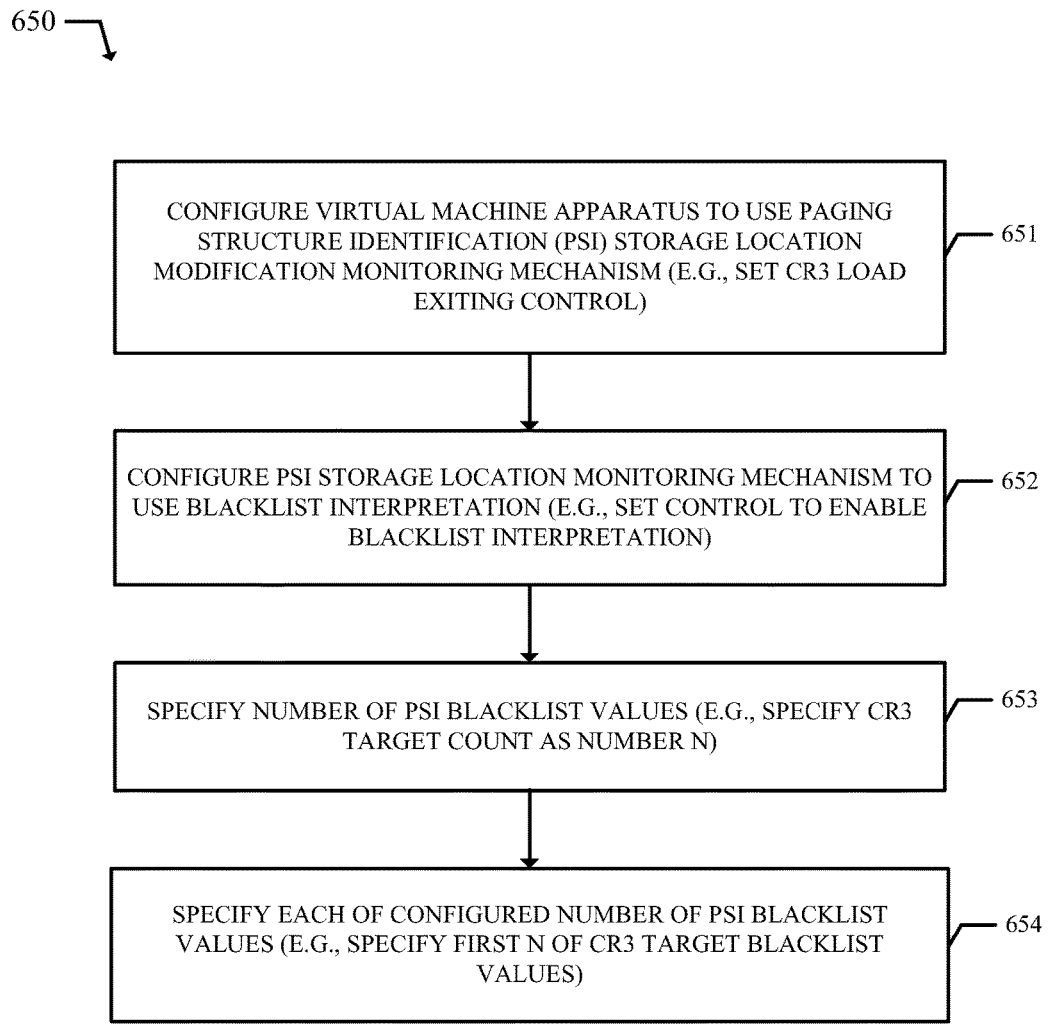
FIG. 6 is a block flow diagram of an embodiment of a method of configuring a virtual machine apparatus.

FIG. 6 is a block flow diagram of an embodiment of a method 650 of configuring a virtual machine apparatus. In some embodiments, the operations and/or method of FIG. 6 may be performed by and/or within any of the virtual machine apparatuses of FIG. 1, 2, or 5. In such embodiments, any of the features and options described above for FIG. 1, 2, or 5 may optionally be used with the method of FIG. 6 and/or any of the features and options described for the method of FIG. 6 may optionally be used with the virtual machine apparatuses of FIG. 1, 2, or 5. Alternatively, the operations and/or method of FIG. 6 may be performed by and/or within a similar or an entirely different virtual machine apparatus. Moreover, the virtual machine apparatuses of FIG. 1, 2, or 5 may perform operations and/or methods either the same as, similar to, or entirely different than, those of FIG. 6.

Referring to the illustration, a virtual machine apparatus may be configured to use a paging structure indication (PSI) storage location modification monitoring mechanism, at block 651. For example, in one particular embodiment, a CR3 load exiting control bit of a primary virtual machine execution control structure (PVMXCS) may be set to binary one. The PSI storage location modification monitoring mechanism may be configured to use a blacklist interpretation of a set of PSI values, at block 652. For example, in one particular embodiment, a single bit control may be set or otherwise configured to a predetermined value to enable the blacklist interpretation. A configured number of PSI blacklist values may be specified, at block 653. For example, in one particular embodiment, a CR3 target count may be specified as a number N. Each of the configured number of PSI blacklist values may be specified, at block 654. For example, in one particular embodiment, the first N CR3 target count values may be specified.

This is just one example embodiment of a suitable method of configuring a virtual machine apparatus. Many variations on the described method are contemplated. For example, alternate embodiments may optionally perform the operations in a different order than illustrated, may overlap certain operations, may combine certain operations, etc. As another example, alternate embodiments may omit certain operations, such as, for example, omitting any one or more of the operations at blocks 651, 652, or 653.

Figure 7:
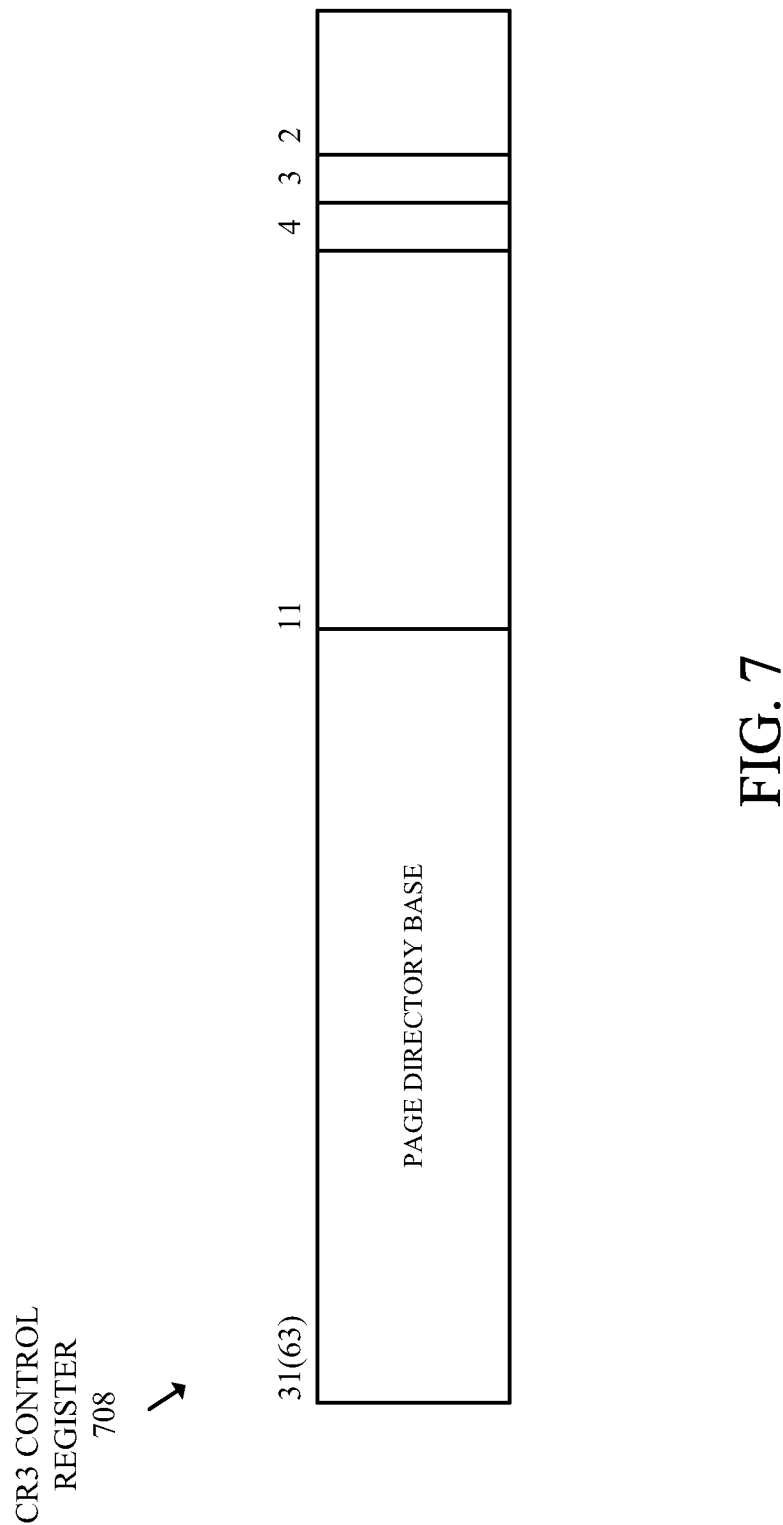
FIG. 7 is a block diagram of an embodiment of a CR3 control register.

FIG. 7 is a block diagram of an embodiment of a CR3 control register 708. The CR3 control register represents one example embodiment of a suitable PSI storage location and/or PDBR. In a 32-bit mode the CR3 register may be 32-bits. In a 64-bit mode the CR3 register may be expanded to 64-bits. The CR3 register may be used to store the physical address of the base of the paging structure hierarchy. Bits 31:12 in 32-bit mode, or bits 63:12 in 64-bit mode, may store the page directory base value. Only the most significant bits, less the lower 12 bits, of the base address may be specified. The lower 12 bits of the address may be assumed to be zero. The first paging structure may thus be aligned to a page (e.g., a 4-KByte) boundary. When using the physical address extension, the CR3 register may include the base address of a page directory pointer table. In one mode (e.g., IA-32e mode), the CR3 register may include the base address of the page map level 4 (PML4) table. An entry in a PML4 table contains the physical address of the base of a page directory pointer table, access rights, and memory management information. The base physical address of the PML4 is stored in CR3. The CR3 register may be used to store two flags that control caching of a paging structure in the processor's internal data caches. Bit-4 of the CR3 is a page-level cache disable (PCD) flag or bit that may control caching on a page-by-page basis. Bit-3 of the CR3 is a page-level write-through (PWT) flag or bit that may control the write-through/writeback caching policy on a page-by-page basis. The MOV to CR3 instruction may be used to manipulate the contents of the CR3 register.

The blacklist interpretation of a set of PSI values as disclosed elsewhere herein may tend to offer certain advantages for certain uses. For one thing, it may allow a set of PSI values to be reserved or held back from one or more virtual machines. For another thing, it may tend to offer improved performance over a whitelist interpretation under certain conditions. Commonly, under a whitelist interpretation, VMM software may add certain process PSI, PBDR, or CR3 values to the set of whitelist values in order to help improve performance. For example, the system process, PID=4 in Windows OS may be added to a CR3 target value VMCS field in order to help improve performance by avoiding a VM exit. However, the VMM may need to monitor all attempted modifications of the PSI storage location, PBDR, or CR3 control register even if only one particular process is interested. Moreover, in some implementations it may be difficult or costly to include all of the innocent PSI, PBDR, or CR3 values (i.e., for the processes not interested) in the whitelist (e.g., into the CR3 target values VMCS fields) especially when tens to hundreds of such processes are running. As a result, under a whitelist interpretation, attempts to modify the PSI storage location, PBDR, or CR3 control register with values that are not whitelist may tend to occur frequently and as a result there may tend to be frequent or numerous VM exits. This may tend to significantly reduce performance. Generally, the more processes running with PSI, PDBR, or CR3 values that are not included in the whitelist the greater the performance degradation may tend to be.

However, under a blacklist interpretation of the PSI, PDBR, or CR3 values, the performance degradation may be reduced. Only the attempts to modify the PSI storage location, PDBR, or CR3 control register to a value matching one of the set of blacklisted values will result in a VM exit. The set of blacklist values may be updated at run time based on the process or processes being monitored. This may tend to allow VMM software to be able to run more efficiently by significantly reducing the number of VM exits. In some embodiments, this may be used along with and/or to extend guest process-specific protection of resources. For example, it may be used by the Trusted Memory Service Layer (TMSL), a lightweight VMM based protection engine used in McAfee DeepSafe Technology, to apply process-specific protection of critical resources. For example, when a process is scheduled, an attempted modification of a PSI storage location, PDBR, or CR3 control register may be triggered. TMSL may then establish an isolated memory sandbox by switching to a specified extended page table view which has an appropriate permission.

To avoid obscuring the description, relatively simple processors and virtual machine apparatus have been shown and described. In other embodiments, the processors and virtual machine apparatus may optionally include other well-known components. For example, the processors may include an instruction fetch unit, an instruction scheduling unit, a branch prediction unit, instruction and data caches, instruction and data translation lookaside buffers, prefetch buffers, microinstruction queues, microinstruction sequencers, bus interface units, second or higher level caches, a retirement unit, a register renaming unit, other components included in processors, and various combinations thereof. Embodiments may have multiple cores, logical processors, or execution engines. There are literally numerous different combinations and configurations of components in processors, and embodiments are not limited to any particular combination or configuration. The processor may represent an integrated circuit or set of one or more semiconductor dies or chips (e.g., a single die or chip, or a package incorporating two or more die or chips). In some embodiments, the processor may represent a system-on-chip (SoC).

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 8A is a block diagram illustrating both an exemplary in-order pipeline and an exemplary register renaming, out-of-order issue/execution pipeline according to embodiments of the invention. FIG. 8B is a block diagram illustrating both an exemplary embodiment of an in-order architecture core and an exemplary register renaming, out-of-order issue/execution architecture core to be included in a processor according to embodiments of the invention. The solid lined boxes in FIGS. 8A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 8A, a processor pipeline 800 includes a fetch stage 802, a length decode stage 804, a decode stage 806, an allocation stage 808, a renaming stage 810, a scheduling (also known as a dispatch or issue) stage 812, a register read/memory read stage 814, an execute stage 816, a write back/memory write stage 818, an exception handling stage 822, and a commit stage 824.

FIG. 8B shows processor core 890 including a front end unit 830 coupled to an execution engine unit 850, and both are coupled to a memory unit 870. The core 890 may be a reduced instruction set computing (RISC) core, a complex instruction set computing (CISC) core, a very long instruction word (VLIW) core, or a hybrid or alternative core type. As yet another option, the core 890 may be a special-purpose core, such as, for example, a network or communication core, compression engine, coprocessor core, general purpose computing graphics processing unit (GPGPU) core, graphics core, or the like.

The front end unit 830 includes a branch prediction unit 832 coupled to an instruction cache unit 834, which is coupled to an instruction translation lookaside buffer (TLB) 836, which is coupled to an instruction fetch unit 838, which is coupled to a decode unit 840. The decode unit 840 (or decoder) may decode instructions, and generate as an output one or more micro-operations, micro-code entry points, microinstructions, other instructions, or other control signals, which are decoded from, or which otherwise reflect, or are derived from, the original instructions. The decode unit 840 may be implemented using various different mechanisms. Examples of suitable mechanisms include, but are not limited to, look-up tables, hardware implementations, programmable logic arrays (PLAs), microcode read only memories (ROMs), etc. In one embodiment, the core 890 includes a microcode ROM or other medium that stores microcode for certain macroinstructions (e.g., in decode unit 840 or otherwise within the front end unit 830). The decode unit 840 is coupled to a rename/allocator unit 852 in the execution engine unit 850.

The execution engine unit 850 includes the rename/allocator unit 852 coupled to a retirement unit 854 and a set of one or more scheduler unit(s) 856. The scheduler unit(s) 856 represents any number of different schedulers, including reservations stations, central instruction window, etc. The scheduler unit(s) 856 is coupled to the physical register file(s) unit(s) 858. Each of the physical register file(s) units 858 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 858 comprises a vector registers unit, a write mask registers unit, and a scalar registers unit. These register units may provide architectural vector registers, vector mask registers, and general purpose registers. The physical register file(s) unit(s) 858 is overlapped by the retirement unit 854 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 854 and the physical register file(s) unit(s) 858 are coupled to the execution cluster(s) 860. The execution cluster(s) 860 includes a set of one or more execution units 862 and a set of one or more memory access units 864. The execution units 862 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 856, physical register file(s) unit(s) 858, and execution cluster(s) 860 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 864). It should also be understood that where separate pipelines are used, one or more of these pipelines may be out-of-order issue/execution and the rest in-order.

The set of memory access units 864 is coupled to the memory unit 870, which includes a data TLB unit 872 coupled to a data cache unit 874 coupled to a level 2 (L2) cache unit 876. In one exemplary embodiment, the memory access units 864 may include a load unit, a store address unit, and a store data unit, each of which is coupled to the data TLB unit 872 in the memory unit 870. The instruction cache unit 834 is further coupled to a level 2 (L2) cache unit 876 in the memory unit 870. The L2 cache unit 876 is coupled to one or more other levels of cache and eventually to a main memory.

By way of example, the exemplary register renaming, out-of-order issue/execution core architecture may implement the pipeline 800 as follows: 1) the instruction fetch 838 performs the fetch and length decoding stages 802 and 804; 2) the decode unit 840 performs the decode stage 806; 3) the rename/allocator unit 852 performs the allocation stage 808 and renaming stage 810; 4) the scheduler unit(s) 856 performs the schedule stage 812; 5) the physical register file(s) unit(s) 858 and the memory unit 870 perform the register read/memory read stage 814; the execution cluster 860 perform the execute stage 816; 6) the memory unit 870 and the physical register file(s) unit(s) 858 perform the write back/memory write stage 818; 7) various units may be involved in the exception handling stage 822; and 8) the retirement unit 854 and the physical register file(s) unit(s) 858 perform the commit stage 824.

The core 890 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 890 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 834/874 and a shared L2 cache unit 876, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 9B:
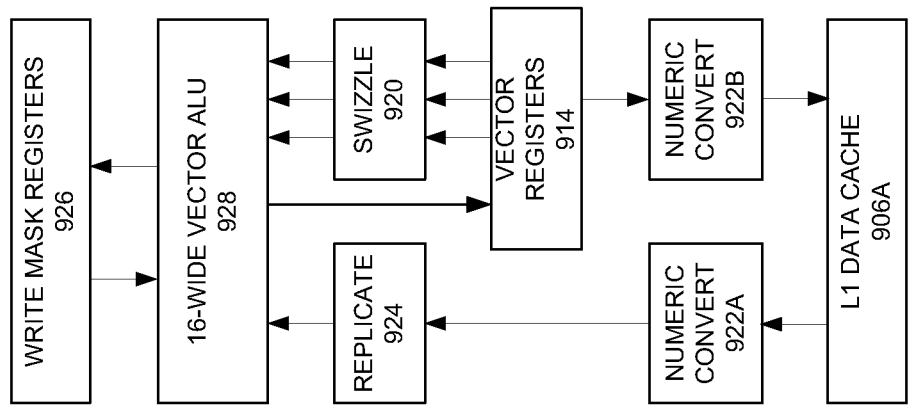
FIG. 9B is an expanded view of part of the processor core in FIG. 9A according to embodiments of the invention.
Figure 9A:
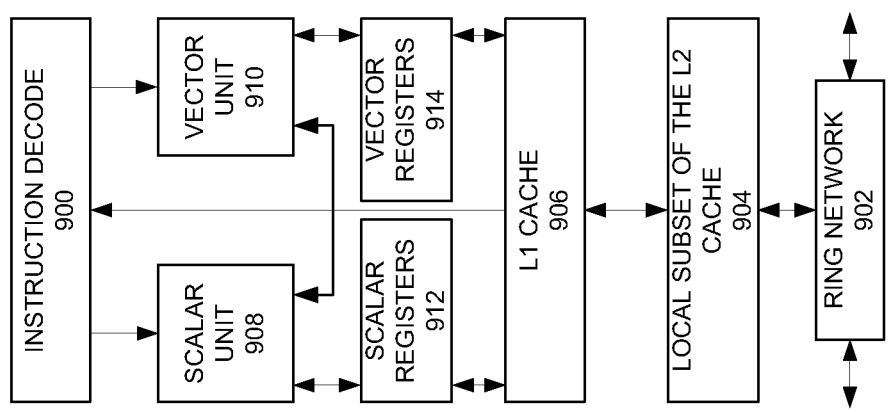
FIG. 9A is a block diagram of a single processor core, along with its connection to the on-die interconnect network and with its local subset of the Level 2 (L2) cache, according to embodiments of the invention.

FIGS. 9A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 9A is a block diagram of a single processor core, along with its connection to the on-die interconnect network 902 and with its local subset of the Level 2 (L2) cache 904, according to embodiments of the invention. In one embodiment, an instruction decoder 900 supports the x86 instruction set with a packed data instruction set extension. An L1 cache 906 allows low-latency accesses to cache memory into the scalar and vector units. While in one embodiment (to simplify the design), a scalar unit 908 and a vector unit 910 use separate register sets (respectively, scalar registers 912 and vector registers 914) and data transferred between them is written to memory and then read back in from a level 1 (L1) cache 906, alternative embodiments of the invention may use a different approach (e.g., use a single register set or include a communication path that allow data to be transferred between the two register files without being written and read back).

The local subset of the L2 cache 904 is part of a global L2 cache that is divided into separate local subsets, one per processor core. Each processor core has a direct access path to its own local subset of the L2 cache 904. Data read by a processor core is stored in its L2 cache subset 904 and can be accessed quickly, in parallel with other processor cores accessing their own local L2 cache subsets. Data written by a processor core is stored in its own L2 cache subset 904 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 9B is an expanded view of part of the processor core in FIG. 9A according to embodiments of the invention. FIG. 9B includes an L1 data cache 906A part of the L1 cache 904, as well as more detail regarding the vector unit 910 and the vector registers 914. Specifically, the vector unit 910 is a 16-wide vector processing unit (VPU) (see the 16-wide ALU 928), which executes one or more of integer, single-precision float, and double-precision float instructions. The VPU supports swizzling the register inputs with swizzle unit 920, numeric conversion with numeric convert units 922A-B, and replication with replication unit 924 on the memory input. Write mask registers 926 allow predicating resulting vector writes.

Processor with Integrated Memory Controller and Graphics

Figure 10:
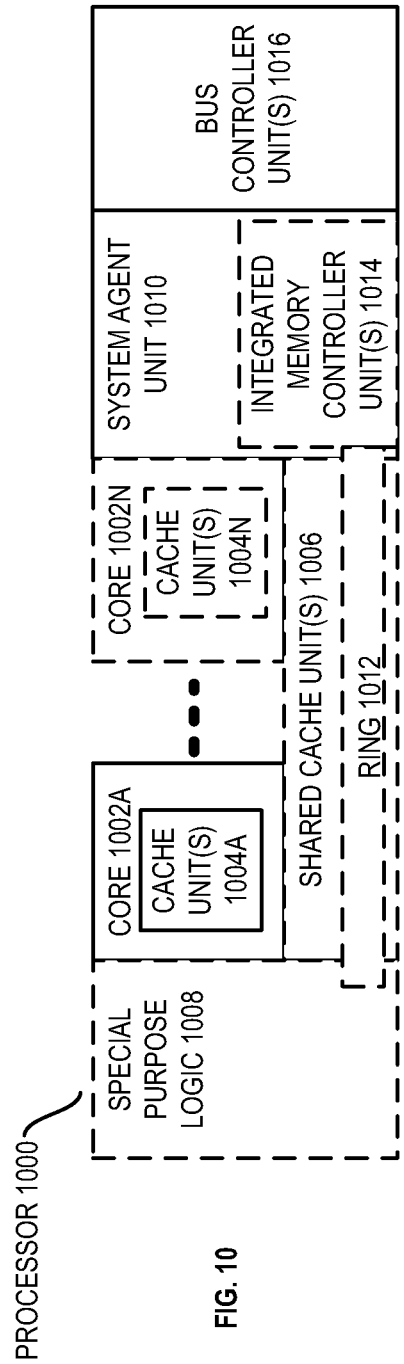
FIG. 10 is a block diagram of a processor that may have more than one core, may have an integrated memory controller, and may have integrated graphics according to embodiments of the invention.

FIG. 10 is a block diagram of a processor 1000 that may have more than one core, may have an integrated memory controller, and may have integrated graphics according to embodiments of the invention. The solid lined boxes in FIG. 10 illustrate a processor 1000 with a single core 1002A, a system agent 1010, a set of one or more bus controller units 1016, while the optional addition of the dashed lined boxes illustrates an alternative processor 1000 with multiple cores 1002A-N, a set of one or more integrated memory controller unit(s) 1014 in the system agent unit 1010, and special purpose logic 1008.

Thus, different implementations of the processor 1000 may include: 1) a CPU with the special purpose logic 1008 being integrated graphics and/or scientific (throughput) logic (which may include one or more cores), and the cores 1002A-N being one or more general purpose cores (e.g., general purpose in-order cores, general purpose out-of-order cores, a combination of the two); 2) a coprocessor with the cores 1002A-N being a large number of special purpose cores intended primarily for graphics and/or scientific (throughput); and 3) a coprocessor with the cores 1002A-N being a large number of general purpose in-order cores. Thus, the processor 1000 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1000 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof. While in one embodiment a ring based interconnect unit 1012 interconnects the integrated graphics logic 1008, the set of shared cache units 1006, and the system agent unit 1010/integrated memory controller unit(s) 1014, alternative embodiments may use any number of well-known techniques for interconnecting such units. In one embodiment, coherency is maintained between one or more cache units 1006 and cores 1002-A-N.

In some embodiments, one or more of the cores 1002A-N are capable of multi-threading. The system agent 1010 includes those components coordinating and operating cores 1002A-N. The system agent unit 1010 may include for example a power control unit (PCU) and a display unit. The PCU may be or include logic and components needed for regulating the power state of the cores 1002A-N and the integrated graphics logic 1008. The display unit is for driving one or more externally connected displays.

The cores 1002A-N may be homogenous or heterogeneous in terms of architecture instruction set; that is, two or more of the cores 1002A-N may be capable of execution the same instruction set, while others may be capable of executing only a subset of that instruction set or a different instruction set.

Exemplary Computer Architectures

FIGS. 11-14 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 11:
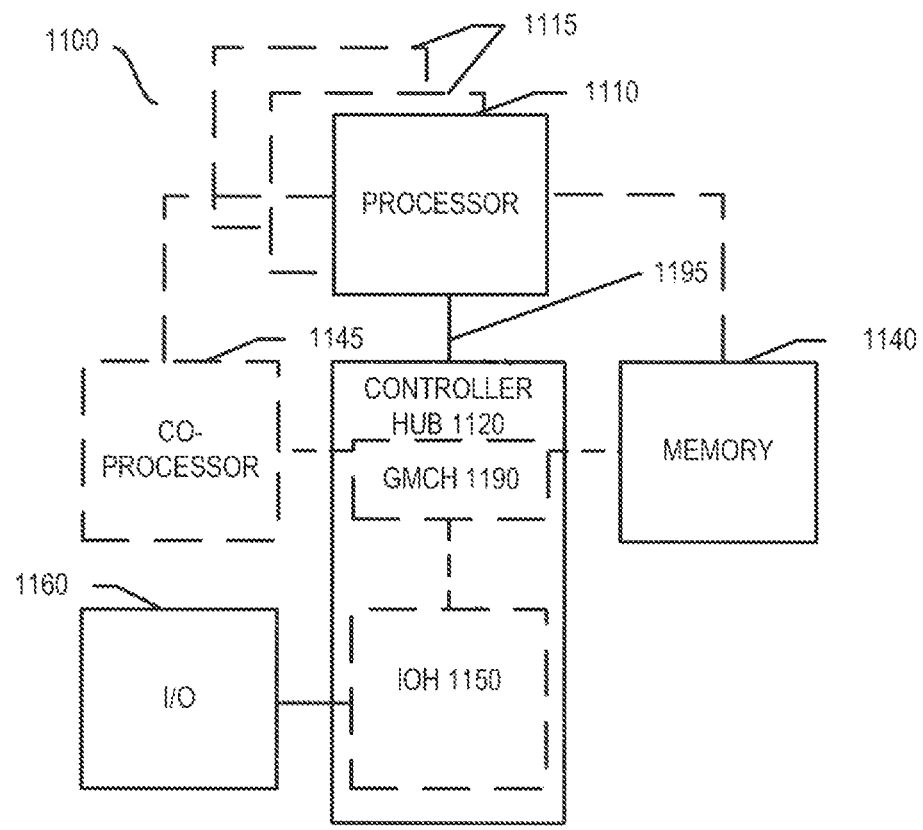
FIG. 11 shown is a block diagram of a system in accordance with one embodiment of the present invention.

Referring now to FIG. 11, shown is a block diagram of a system 1100 in accordance with one embodiment of the present invention. The system 1100 may include one or more processors 1110, 1115, which are coupled to a controller hub 1120. In one embodiment the controller hub 1120 includes a graphics memory controller hub (GMCH) 1190 and an Input/Output Hub (IOH) 1150 (which may be on separate chips); the GMCH 1190 includes memory and graphics controllers to which are coupled memory 1140 and a coprocessor 1145; the IOH 1150 is couples input/output (I/O) devices 1160 to the GMCH 1190. Alternatively, one or both of the memory and graphics controllers are integrated within the processor (as described herein), the memory 1140 and the coprocessor 1145 are coupled directly to the processor 1110, and the controller hub 1120 in a single chip with the IOH 1150.

The optional nature of additional processors 1115 is denoted in FIG. 11 with broken lines. Each processor 1110, 1115 may include one or more of the processing cores described herein and may be some version of the processor 1000.

The memory 1140 may be, for example, dynamic random access memory (DRAM), phase change memory (PCM), or a combination of the two. For at least one embodiment, the controller hub 1120 communicates with the processor(s) 1110, 1115 via a multi-drop bus, such as a frontside bus (FSB), point-to-point interface such as QuickPath Interconnect (QPI), or similar connection 1195.

In one embodiment, the coprocessor 1145 is a special-purpose processor, such as, for example, a high-throughput MIC processor, a network or communication processor, compression engine, graphics processor, GPGPU, embedded processor, or the like. In one embodiment, controller hub 1120 may include an integrated graphics accelerator.

There can be a variety of differences between the physical resources 1110, 1115 in terms of a spectrum of metrics of merit including architectural, microarchitectural, thermal, power consumption characteristics, and the like.

In one embodiment, the processor 1110 executes instructions that control data processing operations of a general type. Embedded within the instructions may be coprocessor instructions. The processor 1110 recognizes these coprocessor instructions as being of a type that should be executed by the attached coprocessor 1145. Accordingly, the processor 1110 issues these coprocessor instructions (or control signals representing coprocessor instructions) on a coprocessor bus or other interconnect, to coprocessor 1145. Coprocessor(s) 1145 accept and execute the received coprocessor instructions.

Figure 12:
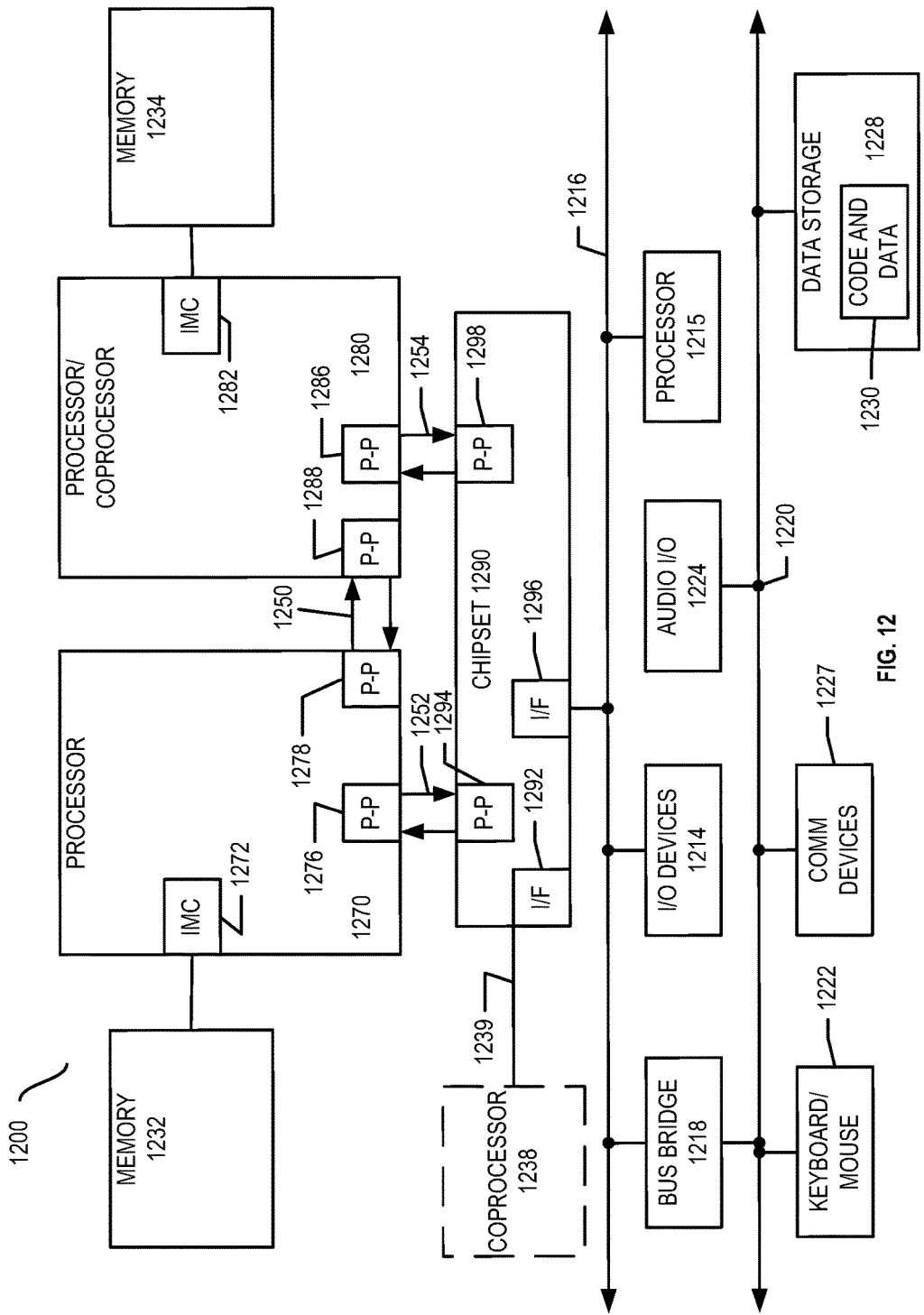
FIG. 12 shown is a block diagram of a first more specific exemplary system in accordance with an embodiment of the present invention.

Referring now to FIG. 12, shown is a block diagram of a first more specific exemplary system 1200 in accordance with an embodiment of the present invention. As shown in FIG. 12, multiprocessor system 1200 is a point-to-point interconnect system, and includes a first processor 1270 and a second processor 1280 coupled via a point-to-point interconnect 1250. Each of processors 1270 and 1280 may be some version of the processor 1000. In one embodiment of the invention, processors 1270 and 1280 are respectively processors 1110 and 1115, while coprocessor 1238 is coprocessor 1145. In another embodiment, processors 1270 and 1280 are respectively processor 1110 coprocessor 1145.

Processors 1270 and 1280 are shown including integrated memory controller (IMC) units 1272 and 1282, respectively. Processor 1270 also includes as part of its bus controller units point-to-point (P-P) interfaces 1276 and 1278; similarly, second processor 1280 includes P-P interfaces 1286 and 1288. Processors 1270, 1280 may exchange information via a point-to-point (P-P) interface 1250 using P-P interface circuits 1278, 1288. As shown in FIG. 12, IMCs 1272 and 1282 couple the processors to respective memories, namely a memory 1232 and a memory 1234, which may be portions of main memory locally attached to the respective processors.

Processors 1270, 1280 may each exchange information with a chipset 1290 via individual P-P interfaces 1252, 1254 using point to point interface circuits 1276, 1294, 1286, 1298. Chipset 1290 may optionally exchange information with the coprocessor 1238 via a high-performance interface 1239. In one embodiment, the coprocessor 1238 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1290 may be coupled to a first bus 1216 via an interface 1296. In one embodiment, first bus 1216 may be a Peripheral Component Interconnect (PCI) bus, or a bus such as a PCI Express bus or another third generation I/O interconnect bus, although the scope of the present invention is not so limited.

As shown in FIG. 12, various I/O devices 1214 may be coupled to first bus 1216, along with a bus bridge 1218 which couples first bus 1216 to a second bus 1220. In one embodiment, one or more additional processor(s) 1215, such as coprocessors, high-throughput MIC processors, GPGPU's, accelerators (such as, e.g., graphics accelerators or digital signal processing (DSP) units), field programmable gate arrays, or any other processor, are coupled to first bus 1216. In one embodiment, second bus 1220 may be a low pin count (LPC) bus. Various devices may be coupled to a second bus 1220 including, for example, a keyboard and/or mouse 1222, communication devices 1227 and a storage unit 1228 such as a disk drive or other mass storage device which may include instructions/code and data 1230, in one embodiment. Further, an audio I/O 1224 may be coupled to the second bus 1220. Note that other architectures are possible. For example, instead of the point-to-point architecture of FIG. 12, a system may implement a multi-drop bus or other such architecture.

Figure 13:
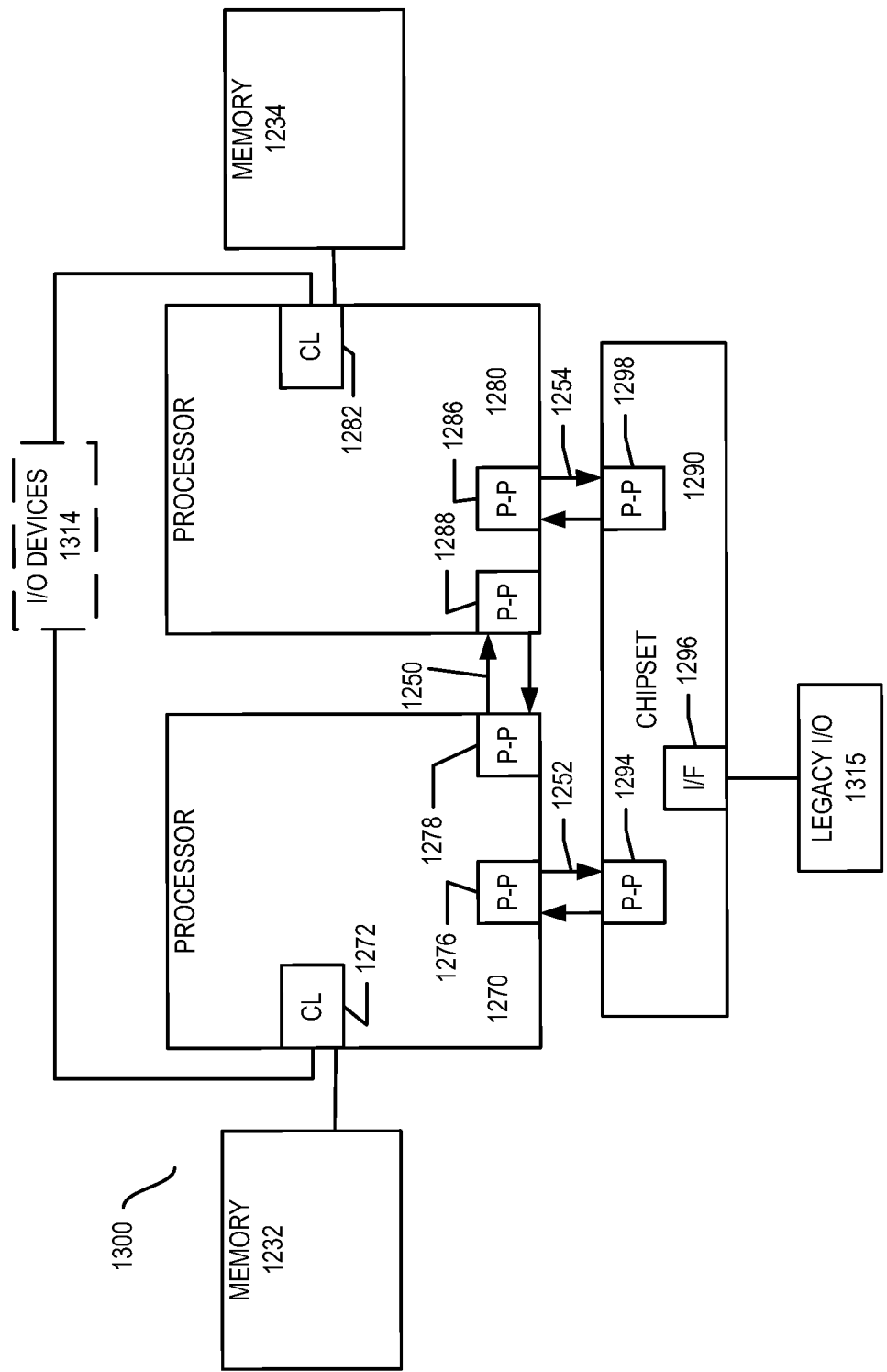
FIG. 13 shown is a block diagram of a second more specific exemplary system 1300 in accordance with an embodiment of the present invention.

Referring now to FIG. 13, shown is a block diagram of a second more specific exemplary system 1300 in accordance with an embodiment of the present invention. Like elements in FIGS. 12 and 13 bear like reference numerals, and certain aspects of FIG. 12 have been omitted from FIG. 13 in order to avoid obscuring other aspects of FIG. 13.

FIG. 13 illustrates that the processors 1270, 1280 may include integrated memory and I/O control logic ("CL") 1272 and 1282, respectively. Thus, the CL 1272, 1282 include integrated memory controller units and include I/O control logic. FIG. 13 illustrates that not only are the memories 1232, 1234 coupled to the CL 1272, 1282, but also that I/O devices 1314 are also coupled to the control logic 1272, 1282. Legacy I/O devices 1315 are coupled to the chipset 1290.

Figure 14:
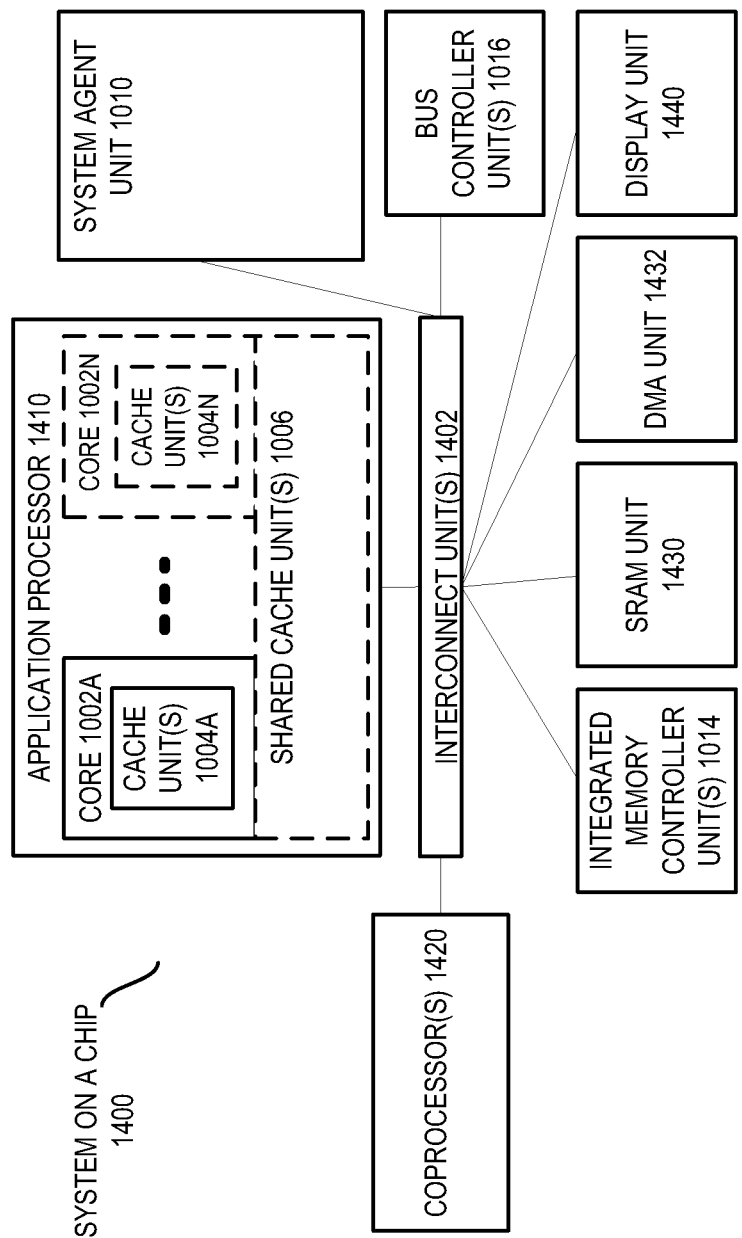
FIG. 14 shown is a block diagram of a SoC in accordance with an embodiment of the present invention.

Referring now to FIG. 14, shown is a block diagram of a SoC 1400 in accordance with an embodiment of the present invention. Similar elements in FIG. 10 bear like reference numerals. Also, dashed lined boxes are optional features on more advanced SoCs. In FIG. 14, an interconnect unit(s) 1402 is coupled to: an application processor 1410 which includes a set of one or more cores 202A-N and shared cache unit(s) 1006; a system agent unit 1010; a bus controller unit(s) 1016; an integrated memory controller unit(s) 1014; a set or one or more coprocessors 1420 which may include integrated graphics logic, an image processor, an audio processor, and a video processor; an static random access memory (SRAM) unit 1430; a direct memory access (DMA) unit 1432; and a display unit 1440 for coupling to one or more external displays. In one embodiment, the coprocessor (s) 1420 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1230 illustrated in FIG. 12, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 15:
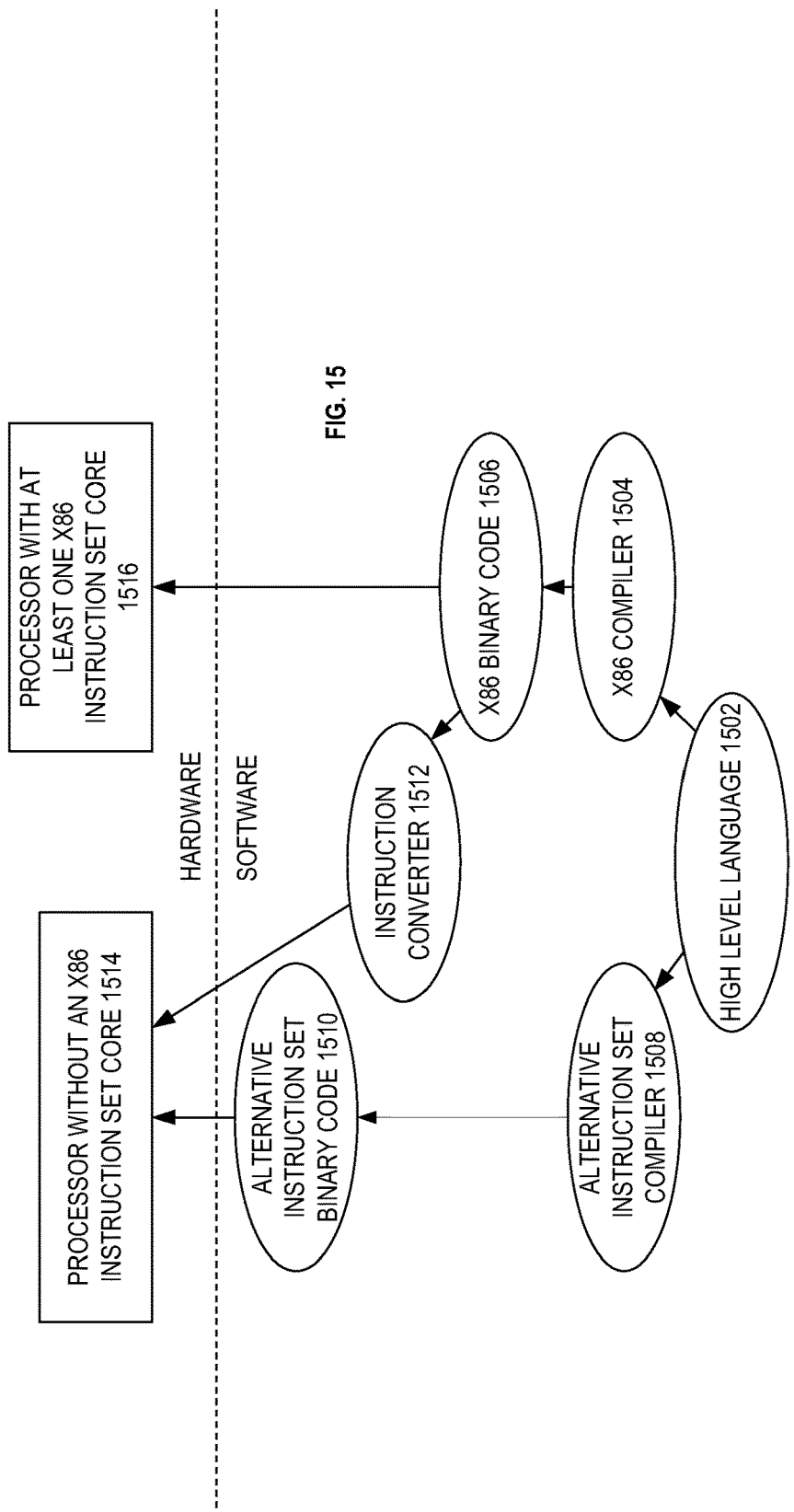
FIG. 15 is a block diagram contrasting the use of a software instruction converter to convert binary instructions in a source instruction set to binary instructions in a target instruction set according to embodiments of the invention.

FIG. 15 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 15 shows a program in a high level language 1502 may be compiled using an x86 compiler 1504 to generate x86 binary code 1506 that may be natively executed by a processor with at least one x86 instruction set core 1516. The processor with at least one x86 instruction set core 1516 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1504 represents a compiler that is operable to generate x86 binary code 1506 (e.g., object code) that can, with or without additional linkage processing, be executed on the processor with at least one x86 instruction set core 1516. Similarly, FIG. 15 shows the program in the high level language 1502 may be compiled using an alternative instruction set compiler 1508 to generate alternative instruction set binary code 1510 that may be natively executed by a processor without at least one x86 instruction set core 1514 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1512 is used to convert the x86 binary code 1506 into code that may be natively executed by the processor without an x86 instruction set core 1514. This converted code is not likely to be the same as the alternative instruction set binary code 1510 because an instruction converter capable of this is difficult to make; however, the converted code will accomplish the general operation and be made up of instructions from the alternative instruction set. Thus, the instruction converter 1512 represents software, firmware, hardware, or a combination thereof that, through emulation, simulation or any other process, allows a processor or other electronic device that does not have an x86 instruction set processor or core to execute the x86 binary code 1506.

In the description and claims, the term "logic" may have been used. As used herein, the term logic may include but is not limited to hardware, firmware, software, or a combination thereof. Examples of logic include integrated circuitry, application specific integrated circuits, analog circuits, digital circuits, programmed logic devices, memory devices including instructions, etc. In some embodiments, the logic may include transistors and/or gates potentially along with other circuitry components.

In the description and claims, the terms "coupled" and "connected," along with their derivatives, may have been used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

The term "and/or" may have been used. As used herein, the term "and/or" means one or the other or both (e.g., A and/or B means A or B or both A and B).

In the description above, for the purposes of explanation, numerous specific details have been set forth in order to provide a thorough understanding of the embodiments of the invention. It will be apparent however, to one skilled in the art, that one or more other embodiments may be practiced without some of these specific details. The particular embodiments described are not provided to limit the invention but to illustrate it. The scope of the invention is not to be determined by the specific examples provided above but only by the claims below. All equivalent relationships to those illustrated in the drawings and described in the specification are encompassed within embodiments of the invention. In other instances, well-known circuits, structures, devices, and operations have been shown in block diagram form or without detail in order to avoid obscuring the understanding of the description.

Where considered appropriate, terminal portions of reference numerals have been repeated among the figures to indicate corresponding or analogous elements, which may optionally have similar or the same characteristics unless specified or clearly apparent otherwise. In some cases, where multiple components have been shown and described, they may be incorporated into a single component. In other cases, where a single component has been shown and described, it may be separated into two or more components. In the drawings, arrows represent couplings and bidirectional arrows represent bidirectional couplings.

Various operations and methods have been described. Some of the methods have been described in a relatively basic form in the flow diagrams, but operations may optionally be added to and/or removed from the methods. In addition, while the flow diagrams show a particular order of the operations according to example embodiments, it is to be understood that that particular order is exemplary. Alternate embodiments may optionally perform the operations in different order, combine certain operations, overlap certain operations, etc. Many modifications and adaptations may be made to the methods and are contemplated.

Some embodiments include an article of manufacture (e.g., a computer program product) that includes a machine-readable medium. The medium may include a mechanism that provides, for example stores, information in a form that is readable by the machine. The machine-readable medium may provide, or have stored thereon, one or more, or a sequence of instructions, that if executed by a machine causes the machine to perform and/or results in the machine performing one or operations, methods, or techniques disclosed herein. In some embodiments, the machine-readable medium may include a tangible non-transitory machine-readable storage media. For example, the tangible non-transitory machine-readable storage media may include a floppy diskette, an optical storage medium, an optical disk, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, or the like. The tangible medium may include one or more solid or tangible physical materials, such as, for example, a semiconductor material, a phase change material, a magnetic material, etc. Examples of suitable machines include, but are not limited to, computer systems, desktops, laptops, notebooks, netbooks, nettops, Mobile Internet devices (MIDs), servers, network elements (e.g., routers, switches, etc.) cellular phones, media players, nettops, set-top boxes, video game controllers, and other electronic devices having one or more processors.

It should also be appreciated that reference throughout this specification to "one embodiment", "an embodiment", or "one or more embodiments", for example, means that a particular feature may be included in the practice of the invention. Similarly, it should be appreciated that in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

What is claimed is:

1. A processor comprising:
    a semiconductor die;
    a paging structure identification storage location on the semiconductor die, the paging structure identification storage location to store a point of entry into a hierarchical set of paging structures; and
    logic on the semiconductor die, and coupled with the paging structure identification storage location, the logic to:
        receive an indication of an attempt from a move to control register instruction, which is to be performed by a virtual machine, and is to be decoded by the processor, to modify the paging structure identification storage location to have a given value for a given point of entry into the hierarchical set of paging structures, wherein the move to control register instruction is to indicate the given value as a source operand and is to indicate the paging structure identification storage location as a destination operand; and
        prevent the attempt, and cause a virtual machine exit, when the given value matches at least one blacklist value in a set of one or more blacklist values, which are to be stored in a virtual machine control structure.

2. The processor of claim 1, wherein the logic is further to:
    receive a second indication of a second attempt to modify the paging structure identification storage location to have a second given value; and
    allow the second attempt when the second given value does not match any of the set of the one or more blacklist values.

3. The processor of claim 1, wherein the logic is further to determine that a control has a first configuration to enable a blacklist interpretation for the set of one or more blacklist values.

4. The processor of claim 1, wherein the logic is to receive the indication of the attempt when an instruction is performed to attempt to store the given value to the paging structure identification storage location.

5. The processor of claim 1, wherein the logic is further to:
    access a configured number of the set of one or more blacklist values; and
    compare the given value with only the configured number of the set of one or more blacklist values.

6. The processor of claim 1, wherein the paging structure identification storage location comprises a register of the processor.

7. The processor of claim 6, wherein the register comprises a page directory base register.

8. A processor comprising:
    a decode unit to decode a move to control register instruction that is to be performed by a virtual machine, the move to control register instruction to indicate a given value as a source operand and to indicate a paging structure identification storage location as a destination operand, wherein the paging structure identification storage location is to comprise a register of the processor and is to store a point of entry into a hierarchical set of paging structures; and
    an execution unit coupled with the decode unit, the execution unit, in response to the decode of the move to control register instruction, to:
        determine whether the given value matches any of a set of one or more blacklist values which are to be stored in a virtual machine control structure; and
        store the given value in the paging structure identification storage location if the given value does not match any of the set of the one or more blacklist values; or
        not store the given value in the paging structure identification storage location, and cause a virtual machine exit, if the given value matches at least one of the set of the one or more blacklist values.

9. The processor of claim 8, wherein the execution unit is further to:
    access a configured number of the set of the one or more blacklist values; and
    compare the given value with only the configured number of the set of the one or more blacklist values.

10. The processor of claim 8, wherein the execution unit is further to determine that a control has a first configuration to enable a blacklist interpretation for the set of the one or more blacklist values.

11. The processor of claim 8, wherein the register comprises a page directory base register.

12. A processor comprising:
    a page directory base register to store a point of entry into a set of hierarchical paging structures;

a decode unit to decode a move to control register instruction that is to be performed by a virtual machine, the move to control register instruction to indicate a given value as a source operand and to indicate the page directory base register as a destination operand; and an execution unit coupled with the decode unit, the execution unit, in response to the decode of the move to control register instruction, to:

determine whether the given value matches any of a set of one or more blacklist values of a virtual machine control structure; and store the given value in the page directory base register if the given value does not match any of the set of the one or more blacklist values; or not store the given value in the page directory base register, and cause a virtual machine exit, if the given value matches at least one of the set of the one or more blacklist values.

13. An article of manufacture comprising a non-transitory machine-readable storage medium, the non-transitory machine-readable storage medium storing a plurality of instructions, the instructions, when performed by a computing machine, to cause the computing machine to perform operations to:

configure a virtual machine apparatus to use a paging structure identification (PSI) storage location modification monitoring mechanism, wherein the PSI storage location modification monitoring mechanism comprises control register load exiting control logic to prevent a move to control register instruction from storing an illegal value in a control register;

configure the PSI storage location modification monitoring mechanism to use a blacklist interpretation;

specify a number of a set of values that are to use the blacklist interpretation;

specify a value for each of the specified number of the set of values in a virtual machine control structure, wherein each of the values represents a point of entry into a hierarchical set of paging tables; and dynamically update the set of values during runtime.

14. The article of manufacture of claim 13, wherein the instructions further comprise instructions that, when performed by the computing machine, are to cause the computing machine to perform operations to configure the virtual machine apparatus to use the PSI storage location modification monitoring mechanism by changing one or more bits in the virtual machine execution control structure.

15. The article of manufacture of claim 13, wherein the instructions further comprise instructions that, when performed by the computing machine, are to cause the computing machine to perform operations to configure the PSI storage location modification monitoring mechanism to use the blacklist interpretation by changing one or more bits in the virtual machine execution control structure.

16. The article of manufacture of claim 13, wherein the instructions further comprise instructions that, when performed by the computing machine, are to cause the computing machine to perform operations to specify the number in a control structure that is different than the virtual machine execution control structure.

* * * * *